United States Patent
Sanou et al.

[11] Patent Number: 6,121,942
[45] Date of Patent: *Sep. 19, 2000

[54] IMAGE-FORMING APPARATUS WITH CORRECTION IN ACCORDANCE WITH POSITIONAL DEVIATIONS BETWEEN ELECTRON-EMITTING DEVICES AND IMAGE-FORMING MEMBERS

[75] Inventors: Yoshihisa Sanou, Atsugi; Hideaki Mitsutake, Yokohama; Naoto Nakamura, Isehara; Hidetoshi Suzuki, Fujisawa, all of Japan

[73] Assignee: Canon Kabushiki Kaisha, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/359,838

[22] Filed: Dec. 20, 1994

[30] Foreign Application Priority Data

Dec. 22, 1993 [JP] Japan .................................. 5-345481
Dec. 16, 1994 [JP] Japan .................................. 6-313283

[51] Int. Cl.⁷ ...................................................... G09G 3/22
[52] U.S. Cl. ............................................. 345/75; 313/495
[58] Field of Search .................................. 345/74, 75, 55, 345/208; 313/495, 496, 497, 421, 422; 315/169.1, 169.2

[56] References Cited

U.S. PATENT DOCUMENTS

| | | | |
|---|---|---|---|
| 4,763,187 | 8/1988 | Biberian ..................................... | 345/75 |
| 4,904,895 | 2/1990 | Tsukamoto et al. ..................... | 313/336 |
| 5,008,657 | 4/1991 | Hanson et al. ........................... | 340/766 |
| 5,066,883 | 11/1991 | Yoshioka et al. ........................ | 313/309 |
| 5,202,674 | 4/1993 | Takemori et al. ........................ | 345/75 |
| 5,256,936 | 10/1993 | Itoh et al. ................................ | 313/495 |
| 5,262,698 | 11/1993 | Dunham ................................ | 315/169.1 |

FOREIGN PATENT DOCUMENTS

| | | |
|---|---|---|
| 0354750 | 2/1990 | European Pat. Off. . |
| 2667428 | 4/1992 | France . |
| 62-287553 | 12/1987 | Japan . |
| 64-31332 | 2/1989 | Japan . |
| 1-100842 | 4/1989 | Japan . |
| 1-100843 | 4/1989 | Japan . |
| 1-146236 | 6/1989 | Japan . |
| 2-257551 | 10/1990 | Japan . |
| 2-229142 | 12/1990 | Japan . |
| 3-55738 | 3/1991 | Japan . |
| 4-28137 | 1/1992 | Japan . |
| 2260022 | 3/1993 | United Kingdom . |
| WO 85-05491 | 12/1985 | WIPO . |

OTHER PUBLICATIONS

"Operation of Tunnel–Emission Devices", C.A. Mead, Journal of Applied Physics, vol. 32, No. 4, Apr. 1961, pp. 646–652.

"Field Emission", W.P. Dyke et al., Advances in Electronics and Electron Physics, vol. VIII, (1956), PP. 90–185.

"Electroforming and Electron Emission of Carbon Thin Films", H. Araki, et al. Journal of Vacuum Society of Japan, vol. 26, No. 1, Tokyo, Japan, pp. 22–29 (1983).

(List continued on next page.)

*Primary Examiner*—Dennis-Doon Chow
*Attorney, Agent, or Firm*—Fitzpatrick, Cella, Harper & Scinto

[57] ABSTRACT

In an image-forming apparatus which includes, on a substrate, an electron beam source comprises plurality of electron-emitting devices, and image-forming members for forming an image upon irradiation of electron beams emitted from the electron-emitting devices, the image-forming members are stripe-shaped members, and the plurality of electron-emitting devices each comprise a negative electrode, an electron-emitting region and a positive electrode which are arranged on the substrate surface side by side in a direction vertical to the direction in which the stripe-shaped members are extending. With the present apparatus, deterioration of image quality is prevented even when the positional relationship between the electron-emitting devices such as cold cathode devices and the image-forming members such as fluorescent substances is deviated from predetermined one during assembly.

78 Claims, 23 Drawing Sheets

OTHER PUBLICATIONS

"Electrical Conduction and Electron Emission of Discontinuous Thin Films", G. Dittmer, Thin Solids Films, Lusanne, Switzerland, pp. 317–328 (1972).

"Physical Properties of Thin–Film Field Emission Cathodes With Molybdenum Cones", C.A. Spindt, et al., Journal Of Applied Physics, vol. 47, No. 12, Dec. 1976.

"The Emission of Hot Electrons And The Field Emission Of Electrons From Tin Oxide", M.I. Elinson, et al., Radio Engineering And Electronic Physics No. 7, Jul. 1965.

"Strong Electron Emission From Patterned Tin–Indium Oxide Thin Films", M. Hartwell, et al., International Electron Devices Meeting Technical Digest, Washington, D.C., 1975, pp. 519–521.

FLUORESCENT MATERIAL

R: RED
G: GREEN
B: BLUE

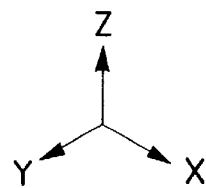
FIG. 7A
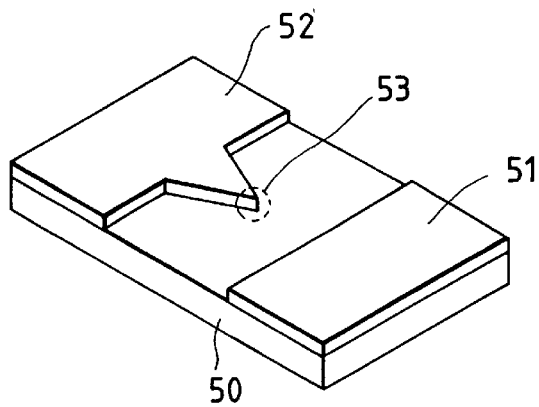
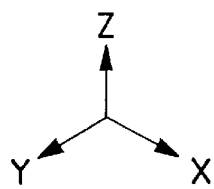
FIG. 7B
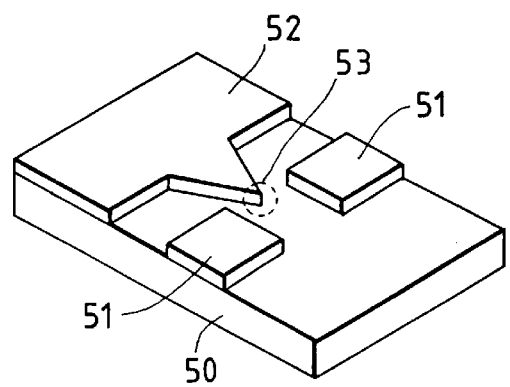
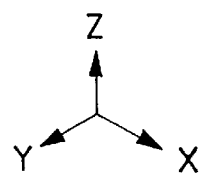
FIG. 7C
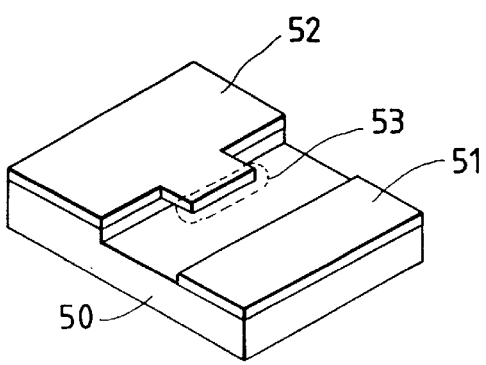

IMAGE-FORMING APPARATUS WITH CORRECTION IN ACCORDANCE WITH POSITIONAL DEVIATIONS BETWEEN ELECTRON-EMITTING DEVICES AND IMAGE-FORMING MEMBERS

BACKGROUND OF THE INVENTION

1. Field of the Invention

The present invention relates to an image-forming apparatus which comprises electron-emitting devices and image-forming members for forming an image upon irradiation of electron beams, and more particularly to an image-forming apparatus which employs fluorescent substances as the image-forming members.

2. Related Background Art

Heretofore, two types of electron-emitting devices are known; i.e., a thermionic cathode device and a cold cathode device. Known cold cathode devices include electron-emitting devices of surface conduction type, field emission type (hereinafter abbreviated to FE), metal/insulating layer/metal type (hereinafter abbreviated to MIM), etc.

One example described in, e.g., M. I. Elinson, Radio Eng. Electron Phys., 10, 1290, (1965) and other later-described examples are known as surface conduction electron-emitting devices.

A surface conduction electron-emitting device utilizes a phenomenon that when a thin film having a small area is formed on a substrate and a current is supplied to flow parallel to the film surface, electrons are emitted therefrom. As to such a surface conduction electron-emitting device, there have been reported, for example, one using a thin film of $SnO_2$ by Elinson cited above, one using an Au thin film [G. Dittmer: "Thin Solid Films", 9, 317 (1972)], one using a thin film of $In_2O_3/SnO_2$ [M. Hartwell and C. G. Fonstad: "IEEE Trans. ED Conf.", 519 (1975)], and one using a carbon thin film [Hisashi Araki et al.: "Vacuum", Vol. 26, No. 1, 22 (1983)].

As a typical configuration of those surface conduction electron-emitting devices, FIG. 30 shows a plan of the device proposed by M. Hartwell, et al. in the above-cited paper. In FIG. 30, denoted by reference numeral 301 is a substrate and 304 is a conductive thin film made of a metal oxide formed by sputtering. As shown, the conductive thin film 304 is formed into an H-shaped pattern in a plan view. The conductive thin film 304 is subjected to an energizing process called forming by energization (described later) to form an electron-emitting region 305. The dimensions indicated by L and W in the drawing are set to 0.5–1 mm and 0.1 mm, respectively. Although the electron-emitting region 305 is shown as being rectangular centrally of the conductive thin film 304, the region 305 is illustrated so only for the convenience of drawing and does not exactly represent the actual position and shape thereof.

In those surface conduction electron-emitting devices, including the one proposed by M. Hartwell et al., it has heretofore been customary that, before starting emission of electrons, the conductive thin film 304 is subjected to an energizing process called forming by energization to form the electron-emitting region 305. The term "forming by energization" means a process of applying a DC voltage being constant or rising very slowly at a rate of, for example, 1 V/minute, across the conductive thin film 304 to locally destroy, deform or denature it to thereby form the electron-emitting region 305 which has been transformed into an electrically high-resistance state. This produces a fissure in a portion of the conductive thin film 304 which has been locally destroyed, deformed or denatured. When an appropriate voltage is applied to the conductive thin film 304 after the forming by energization, electrons are emitted from the vicinity of the fissure.

Examples of FE electron-emitting devices are described in, e.g., W. P. Dyke & W. W. Dolan, "Field emission", Advance in Electron Physics, 8, 89 (1956) and C. A. Spindt, "Physical properties of thin-film field emission cathodes with molybdenium cones", J. Appl. Phys., 47, 5248 (1976).

As one typical configuration of the FE devices, FIG. 31 shows a section of the device proposed by C. A. Spindt. In FIG. 31, denoted by reference numeral 310 is a substrate, 311 is an emitter wiring made of any suitable conductive material, 312 is an emitter cone, 313 is an insulating layer, and 314 is a gate electrode. When an appropriate voltage is applied between the emitter cone 312 and the gate electrode 314, this device emits electrons from the tip end of the emitter cone 312.

Other than the laminated structure shown in FIG. 31, there is also known another configuration of the FE devices in which an emitter and a gate electrode are arranged side by side on a substrate substantially parallel in the substrate plane.

One example of MIM electron-emitting devices is described in, e.g., C. A. Mead, "Operation of tunnel-emission devices", J. Appl. Phys., 32, 646 (1961). One typical configuration of the MIM devices is shown in a sectional view of FIG. 32. In FIG. 32, denoted by reference numeral 320 is a substrate, 321 is a lower electrode made of metal, 322 is a thin insulating layer being about 100 angstroms thick, and 323 is an upper electrode made of metal and being about 80–300 angstroms thick. When an appropriate voltage is applied between the upper electrode 323 and the lower electrode 321, this MIM device emits electrons from the surface of the upper electrode 323.

The above-described cold cathode devices can emit electrons at a lower temperature than needed in thermionic cathode devices, and hence require no heaters for heating the devices. Accordingly, the cold cathode devices are simpler in structure and can be formed in a finer pattern than thermionic cathode devices. Further, even when a number of cold cathode devices are arrayed on a substrate at a high density, the problem of hot-melting the substrate is less likely to occur. Additionally, unlike thermionic cathode devices which have a low response speed because they operate under heating by heaters, the cold cathode devices are also advantageous in having a high response speed.

For that reason, intensive studies have been focused on applications of the cold cathode devices.

Of the cold cathode devices, particularly, the surface conduction electron-emitting device is simple in structure and easy to manufacture, and hence has an advantage that a number of devices can be formed into an array having a large area. Therefore, methods of arraying a number of devices and driving them have been studied as disclosed in, e.g., Japanese Patent Application Laid-Open No. 64-31332 in the name of the same assignee.

Various applications of surface conduction electron-emitting devices have also been studied in the fields of image-forming apparatus such as image display devices and image recording devices, charged beam sources, and so on.

As an application to image display devices, particularly, one employing a combination of a surface conduction electron-emitting device and a fluorescent substance which emits light upon irradiation of an electron beam has been researched as disclosed in, e.g., U.S. Pat. No. 5,066,883 issued to the same assignee and Japanese Patent Application Laid-Open No. 2-257551 and No. 4-28137 both in the name of the same assignee. Such an image display device employing the combination of a surface conduction electron-emitting device and a fluorescent substance is expected to have superior characteristics to other conventional image display devices. As compared with display devices using liquid crystals which have recently become popular, for example, the above combined display device is superior in that it does not require any backlight because of being self-luminous and has a wider field angle of vision.

One of methods of arraying a number of FE devices and driving them is disclosed in, e.g., U.S. Pat. No. 4,904,895 issued to the same assignee. As an application example of FE devices to an image display device, there is known a flat display device reported by R. Meyer, for example. [R. Meyer: "Recent Development on Microtips Display at LETI", Tech. Digest of 4th Int. Vacuum Microelectronics Conf., Nagahama, pp. 6–9 (1991)].

One example in which an array of numerous MIM devices is applied to an image display device is disclosed in, e.g., Japanese Patent Application Laid-Open No. 3-55738 in the name of the same assignee.

The inventors have attempted manufacture of cold cathode devices by using a variety of materials, methods and structures, including the ones described above as the prior art. Also, the inventors have studied a multi-electron beam source having an array of numerous cold cathode devices, and an image display device in which the multi-electron beam source is employed.

For example, the inventors have tried a multi-electron beam source using an electrical wiring method as shown in FIG. 28. Specifically, the multi-electron beam source is arranged such that a number of cold cathode devices are arrayed two-dimensionally and wired into a matrix pattern as shown.

In FIG. 28, denoted by 401 is a cold cathode device symbolically shown, 402 is a row-directional wiring, and 403 is a column-directional wiring. While the row- and column-directional wirings 402, 403 have in fact finite electric resistances, these resistances are indicated as wiring resistors 404, 405 in the drawing. The illustrated wiring arrangement will be referred to as a simple matrix wiring.

FIG. 28 shows the array of a 6×6 matrix for the convenience of drawing. However, the matrix size is not of course limited to the illustrated one. A multi-electron beam source for an image display device, for example, is formed by arraying and wiring cold cathode devices in number enough to provide desired image display.

In a multi-electron beam source having cold cathode devices arrayed with the simple matrix wiring, appropriate electric signals are applied to the row-directional wirings 402 and the column-directional wirings 403 for emitting desired electron beams. To drive any one row of cold cathode devices in the matrix, for example, a select voltage Vs is applied to the row-directional wiring 402 to be selected and, simultaneously, a non-select voltage Vns is applied to the other row-directional wirings 402 not selected. In synch with application of the voltages to the row-directional wirings 402, a drive voltage Ve for enabling the devices to emit electron beams is applied to the column-directional wirings 403. With this method, ignoring voltage drops through the wiring resistances 404 and 405, the voltage Ve−Vs is applied to the cold cathode devices in the selected row and the voltage, Ve−Vns is applied to the cold cathode devices in the non-selected rows. If the voltages Ve, Vs and Vns are set to have suitable values, electron beams are emitted with the desired intensity only from the cold cathode devices in the selected row. Also, if the drive voltage Ve applied to the column-directional wirings 403 is set to have respective different values, electron beams are emitted with the different intensities from the individual cold cathode devices in the selected row. Further, if the duration in which the drive voltage Ve is applied is changed, the period of time in which the electron beam is emitted can also be changed.

Accordingly, the multi-electron beam source having cold cathode devices arrayed with the simple matrix wiring is applicable to various fields. For example, that multi-electron beam source can be suitably used as an electron source for an image display device by properly applying electric signals to the cold cathode devices in accordance with image information.

However, the following problems have been raised with practical use of the multi-electron beam source having cold cathode devices arrayed with the simple matrix wiring.

FIG. 29 shows, by way of example, a section of one prior art image display panel including cold cathode devices and fluorescent substances. In FIG. 29, denoted by 410 is a back plate, 411 is a cold cathode device formed on the back plate, 412 is a side wall, 413 is a face plate, and 414 is a fluorescent substance disposed on an inner surface of the face plate. A vacuum container is formed by the back plate 410, the side walls 412 and the face plate 413. In such a display panel, an image is displayed by irradiating an electron beam e⁻ emitted from the cold cathode device 411 to the fluorescent substance 414, causing the fluorescent substance 414 to radiate visible light VL.

However, the above display panel accompanies the problem of rendering a displayed image deficient or uneven in luminance or giving rise to unexact coloration because of insufficient accuracy of assembly during manufacture.

More specifically, when assembling the vacuum container, the components are firmly bonded to each other by using an adhesive, such as frit glass, to establish and maintain air tightness, but a high temperature not lower than 400° C. is required to melt the frit glass. Even if the components are positioned with sufficiently high accuracy beforehand, their positions are apt to deviate in the heating step due to thermal expansion of the components themselves and fixing jigs and, once bonded, it is practically impossible to correct resultant deviations of the positions.

Accordingly, there often occurs an uncorrectable positional deviation between the back plate 410 including the cold cathode devices formed thereon and the face plate 414 including the fluorescent substances disposed thereon.

As an alternative, even if the panel structure is modified such that the back plate 410 including the cold cathode devices formed thereon and the face plate 414 including the fluorescent substances disposed thereon are fixed inside a separate vacuum container, the positional relationship between the plates is also apt to deviate similarly due to thermal expansion in a heating step needed to seal off the separate vacuum container. Further, once the vacuum container is sealed off, it is practically impossible in the modified panel structure to correct the positions of both the plates fixed inside the container.

If the positional relationship between the cold cathode devices and the fluorescent substances is deviated, the electron beams e⁻ emitted from the cold cathode devices do not precisely irradiate the corresponding fluorescent substances, resulting in the problem that image quality is remarkably deteriorated because of lack of an edge of the displayed image, deficiency or unevenness in luminance of the image, or occurrence of inexact coloration. Moreover, since the direction and magnitude of the positional deviation are varied for each of display panels, it is very difficult to provide a number of display panels which have uniform display capabilities.

SUMMARY OF THE INVENTION

In view of the problems mentioned above, a main object of the present invention is to provide an image-forming apparatus which has means for preventing deterioration of image quality even when the positional relationship between electron-emitting devices such as cold cathode devices and image-forming members such as fluorescent substances is deviated from predetermined ones during assembly.

Specifically, the present invention provides an image-forming apparatus which includes, on a substrate, an electron beam source comprising a plurality of electron-emitting devices, and image-forming members for forming an image upon irradiation of electron beams emitted from the electron-emitting devices, wherein the image-forming members are stripe-shaped members, and the plurality of electron-emitting devices each comprise a negative electrode, an electron-emitting region and a positive electrode which are arranged on the substrate surface side by side in a direction vertical to the direction in which the stripe-shaped members are extending.

BRIEF DESCRIPTION OF THE DRAWINGS

FIGS. 7A to 7C are perspective views each showing a typical lateral field-effect electron-emitting device.

DESCRIPTION OF THE PREFERRED EMBODIMENTS

Figure 1A:
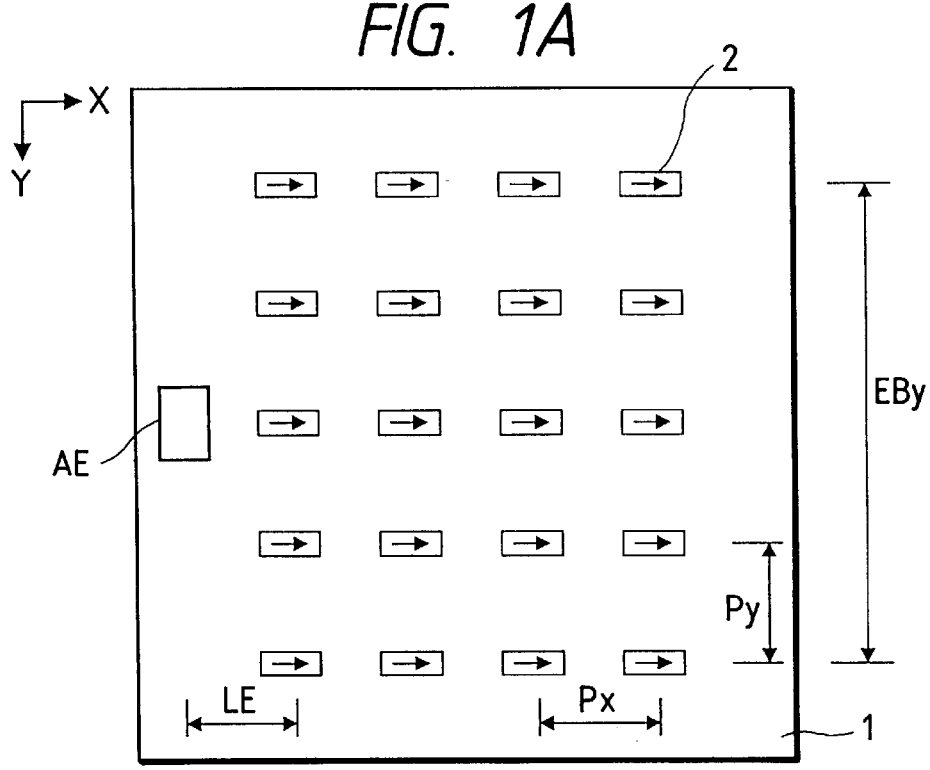
FIGS. 1A and 1B are plan views showing set positions of electron-emitting devices and fluorescent substances in respective display panels of Embodiments 1 and 2.

For convenience of the description, it is hereinafter assumed that the direction in which a negative electrode, an electron-emitting region and a positive electrode of each of electron-emitting devices making up a multi-electron beam source are arranged side by side is an X-direction and a direction perpendicular to the above direction is a Y-direction. Also, the description below will be made as using stripes of fluorescent substances, by way of example, as image-forming members.

First, with the certain relationship in arrangement between the electron-emitting devices and the stripes of fluorescent substances (vertical to each other) according to the present invention, when positions of the fluorescent substances are deviated from a set value in the Y-direction with respect to the electron-emitting devices, the positions irradiated by electron beams are deviated from set positions, but the electron beams are at least kept from irradiating the stripes of fluorescent substances adjacent to the intended ones.

Therefore, even if there occurs a positional deviation in the Y-direction, the occurrence of inexact coloration can be prevented.

In addition to the above first feature, preferably, a region of the fluorescent substances is selected to be larger than a region in which the electron beam source is arranged on a substrate. With this feature, when positions of the fluorescent substances are deviated from the set value in the Y-direction with respect to the electron-emitting devices, even electron beams emitted from the electron-emitting devices formed in an edge of the predetermined region for the multi-electron beam source can always irradiate the stripes of fluorescent substances.

Therefore, even if there occurs a positional deviation in the Y-direction, the displayed image can be prevented from lacking its edge.

Further, as described later with reference to FIGS. 26A and 26B, even if there occurs a positional deviation in the X-direction, the displayed image can also be prevented from lacking its edge.

In addition to the above first feature, preferably, when positions of the fluorescent substances are deviated from the set value in the X-direction with respect to the electron-emitting devices, paths of the electron beams are corrected by correcting a voltage applied to the fluorescent substances in accordance with the positional deviation in the X-direction.

With this feature, even if there occurs positional deviations not only in the Y-direction but also in the X-direction, the occurrence of inexact coloration and a reduction in luminance can be prevented. Further, even if there occurs a deviation in set angle of the fluorescent substances, the occurrence of inexact coloration and a reduction in luminance can also be prevented.

In addition to the above first feature, preferably, when positions of the fluorescent substances are deviated from the set value in the X-direction with respect to the electron-emitting devices, paths of the electron beams are corrected by correcting a voltage applied to each of the electron-emitting devices in accordance with the positional deviation in the X-direction.

With this feature, even if there occurs positional deviations not only in the Y-direction but also in the X-direction, the occurrence of inexact coloration and a reduction in luminance can be prevented. Further, even if there occurs a deviation in set angle of the fluorescent substances, the occurrence of inexact coloration and a reduction in luminance can also be prevented.

In addition to the above first feature, preferably, when positions of the fluorescent substances are deviated from the set value with respect to the electron-emitting devices, drive signals supplied to the electron-emitting devices are adjusted to adequate signals by correcting image signals in accordance with the positional deviation.

With this feature, when paths of the electron beams are corrected in accordance with the positional deviation, it is possible to prevent image quality from deteriorating additionally incidental to the correction.

Preferably, a change in luminance caused by the correction of paths of the electron beams can be prevented by correcting luminance of the image signals in accordance with the positional deviation. Even in the case where the positional deviation is large, particularly, satisfactory display can be achieved by correcting an array of the image signals.

More specifically, if there occurs a positional deviation over one pitch of the stripes of fluorescent substances, the drive signals supplied to the electron-emitting devices are shifted in an amount corresponding to the number of pitches deviated. For example, if there occurs a positional deviation over two pitches but less than three pitches in the X-direction, the array of the image signals is adjusted in an amount corresponding to two pitches so that the drive signals based on the image signals, which are effectively shifted in units of two devices from the original array, are applied to the electron-emitting devices. By so adjusting, even if there occurs a positional deviation over one pitch of the stripes of fluorescent substances, the amount by which the paths of the electron beams are to be corrected is less than one pitch. As a result, when the paths of the electron beam are corrected, it is possible to prevent the shape of a bright point from changing, the luminance thereof from shifting, and the dynamic range of gradation from reducing.

Preferably, luminance of the displayed image is corrected by correcting pulse widths of voltage pulses applied to the electron-emitting devices in accordance with the positional deviation in the X-direction, to thereby correct amounts of electric charges of the electron beams irradiated onto the fluorescent substances.

With this feature, luminance of emitted light can be prevented from becoming uneven.

Preferably, by using lateral field-effect electron emitting devices as the electron-emitting devices, the image-forming apparatus according to the present invention can be realized with a simple construction.

Preferably, by using surface conduction electron-emitting devices as the electron-emitting devices, the image-forming apparatus according to the present invention can be realized with a simple construction and manufacture process.

[Embodiment 1]

A preferred embodiment of an image display device of the present invention will be described below in the order of the structure and manufacture process of a display panel, the preferable structure and manufacture process of electron-emitting devices, the configuration of an electric circuitry, and the procedures of correction for convenience of the description.

(Structure and Manufacture Process of Display Panel)

First, the structure and manufacture process of a display panel in the image display device will be described in connection with a practical example.

Figure 2:
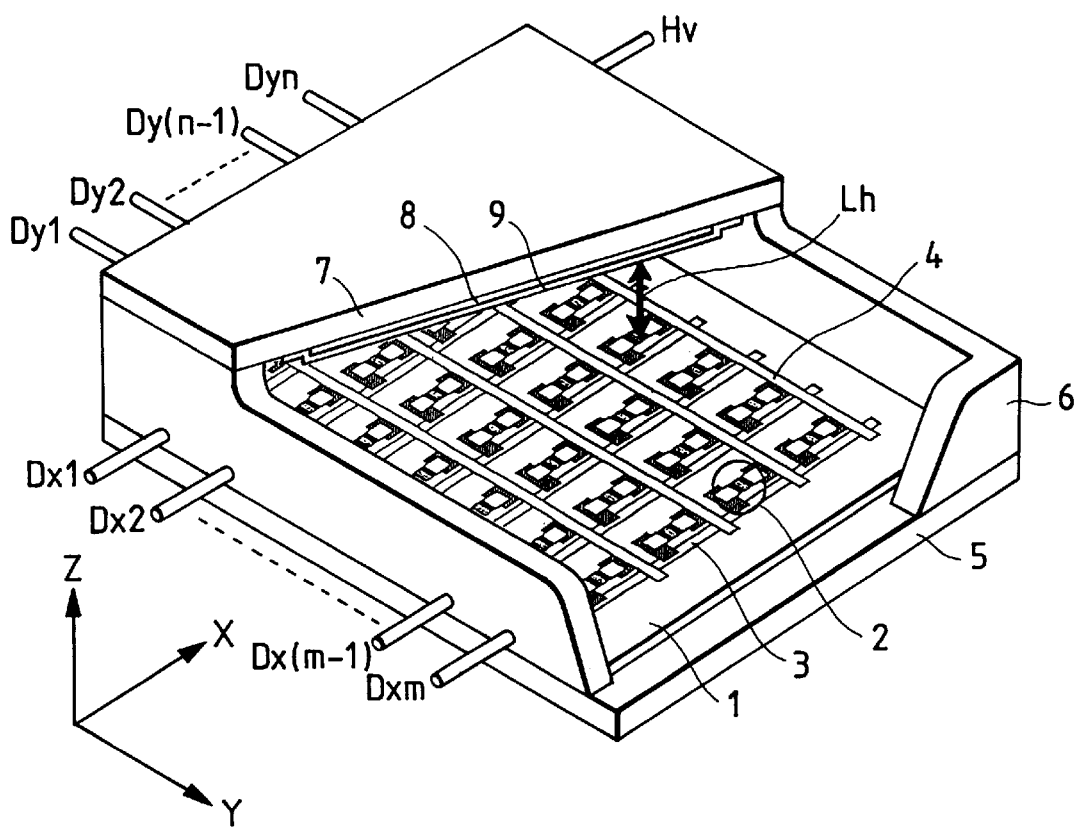
FIG. 2 is a perspective view, partly broken away, of a display panel in an image display device according to an embodiment of the present invention.

FIG. 2 is a perspective view of the display panel in this Embodiment, the view being partly broken away to show the internal structure.

In FIG. 2, denoted by 5 is a rear plate, 6 is a side plate, and 7 is a face plate. These members 5 to 7 jointly make up a hermetic container for maintaining a vacuum inside the display panel. When assembling the hermetic container, the joined portions between the constituent members must be sealed off to ensure a sufficient degree of strength and air tightness. This sealing-off is achieved by, for example, applying frit glass to the joined portions, and then baking it in an atmosphere of air or nitrogen gas at 400° C. to 500° C. for 10 minutes or more. The method of evacuating the interior of the hermetic container will be described later.

A substrate 1 is fixed to the rear plate 5, and a number (N×M) of electron-emitting devices 2 are formed on the substrate 1. (N and M are each a positive integer not less than 2 and are optionally set depending upon the number of display pixels intended. In a display device intended for a high-quality TV, for example, N and M are preferably not less than 3000 and 1000, respectively. In this Embodiment, N=3072 and M=1024 were set.) The number (N×M) of electron-emitting devices are arrayed with the simple matrix wiring using M lines of row-directional wirings 3 and N lines of column-directional wirings 4. The assembly constituted by the components 1 to 4 is referred to as a multi-electron beam source. The manufacture process and structure of the multi-electron beam source will be described later in detail.

While the substrate 1 for the multi-electron beam source is fixed to the rear plate 5 of the hermetic container in this Embodiment, the substrate 1 for the multi-electron beam source may be itself used as the rear plate of the hermetic container if it has a sufficient degree of strength.

Figure 3:
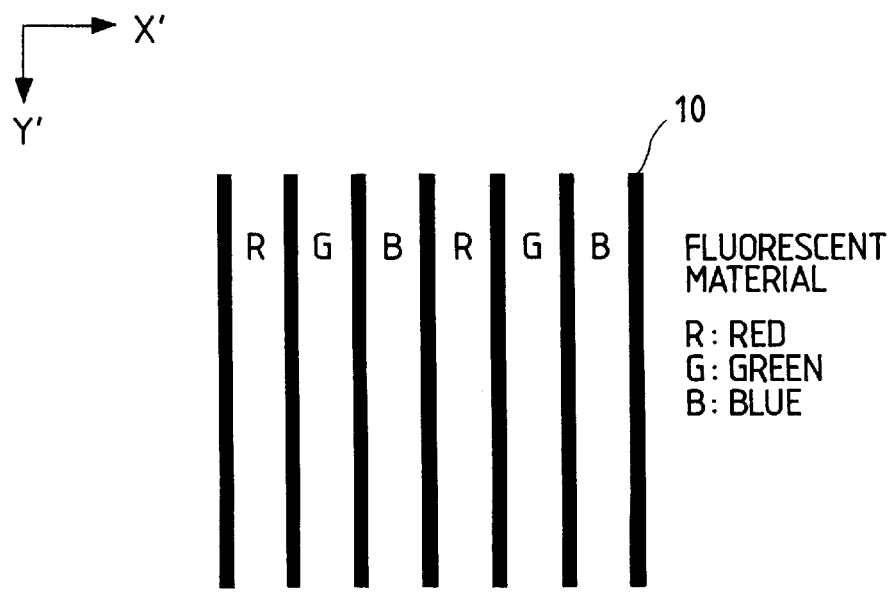
FIG. 3 is a plan view showing an arrangement of fluorescent substances on a face plate of the display panel.

A fluorescent film 8 is formed on a lower surface of the face plate 7. Since this Embodiment concerns a color display device, the fluorescent film 8 comprises fluorescent substances in three primary colors, i.e., red, green and blue, which are usually used in the field of CRTs and are coated separately from each other. As shown in FIG. 3, by way of example, the fluorescent substances in respective colors are coated in a striped pattern with black conductors 10 disposed between adjacent stripes of the fluorescent substances. The purposes of providing the black conductors 10 are to eliminate an offset of the displayed color even if the positions irradiated by electron beams are slightly deviated, to suppress reflection of exterior light for preventing a reduction in contrast, and to prevent the fluorescent film from being charged up with electron beams. A material containing graphite as a primary ingredient is employed as the black conductors 10, but any other material which can achieve the above purposes may also be used.

On the surface of the fluorescent film 8 facing the rear plate 5, a metal back 9, which is well known in the field of CRTs, is disposed. The purposes of providing the metal back 9 are to increase a rate of light utilization by mirror-reflecting part of the light emitted from the fluorescent film 8, to protect the fluorescent film 8 from collisions with negative ions, to serve as an electrode for applying an electron beam accelerating voltage, and to serve as an electric guide path for electrons after exciting the fluorescent film 8. The metal back 9 is fabricated by a method of, after forming the fluorescent film 8 on the face plate 7, smoothing the surface of the fluorescent film and then depositing Al thereon by vacuum evaporation. Note that when the fluorescent film 8 is formed of a fluorescent material for low voltage, the metal back 9 is not needed.

Though not used in this Embodiment, a transparent electrode made of, e.g., ITO may be provided between the face plate 7 and the fluorescent film 8, aiming to apply an accelerating voltage or to increase conductivity of the fluorescent film.

Additionally, Lh in FIG. 2 represents the distance between the electron-emitting devices 2 and the fluorescent film 8.

Denoted by Dx1 to Dxm, Dy1 to Dyn, and Hv are terminals for electrical connection of the hermetic structure adapted to electrically connect the display panel and an electric circuitry (not shown). Dx1 to Dxm are electrically connected to the row-directional wirings 3 of the multi-electron beam source, Dy1 to Dyn are in the column-directional wirings 4 of the multi-electron beam source, and Hv is to the metal back 9 of the face plate, respectively.

For creating a vacuum inside the hermetic container, after assembling the hermetic container, an evacuation tube and a vacuum pump (both not shown) are connected to the container and the interior of the container is evacuated to a vacuum degree of about $10^{-7}$ Torr. Then, the evacuation tube is sealed off. To maintain the desired vacuum degree in the hermetic container, a gettering film (not shown) is formed at a predetermined position in the hermetic container immediately before or after the sealing-off. The gettering film is a film formed by heating and evaporating a gettering material, which contains, e.g., Ba as a main ingredient, by a heater or high-frequency heating. The interior of the hermetic container is maintained at a vacuum degree of $1 \times 10^{-5}$ to $1 \times 10^{-7}$ Torr under an adsorbing action of the gettering film.

A description will now be made of set positions of the electron-emitting devices 2 formed on the substrate 1 and set positions of the stripes of fluorescent substances formed on the face plate 7 with reference to FIGS. 1A and 1B.

FIG. 1A is a schematic plan view of the substrate 1. Referring to FIG. 1A, denoted by 2 is an electron-emitting device and an arrow indicates the direction in which each electron-emitting device is formed. (The direction in which the electron-emitting device is formed will be described later in detail along with a structure of the electron-emitting device). Although only 4×5=20 devices are shown for convenience of illustration, a much larger number of electron-emitting devices are in fact formed in the X- and Y-directions so as to provide a matrix pattern. Also, the row-directional wirings and the column-directional wirings are omitted from FIG. 1A.

Figure 1B:
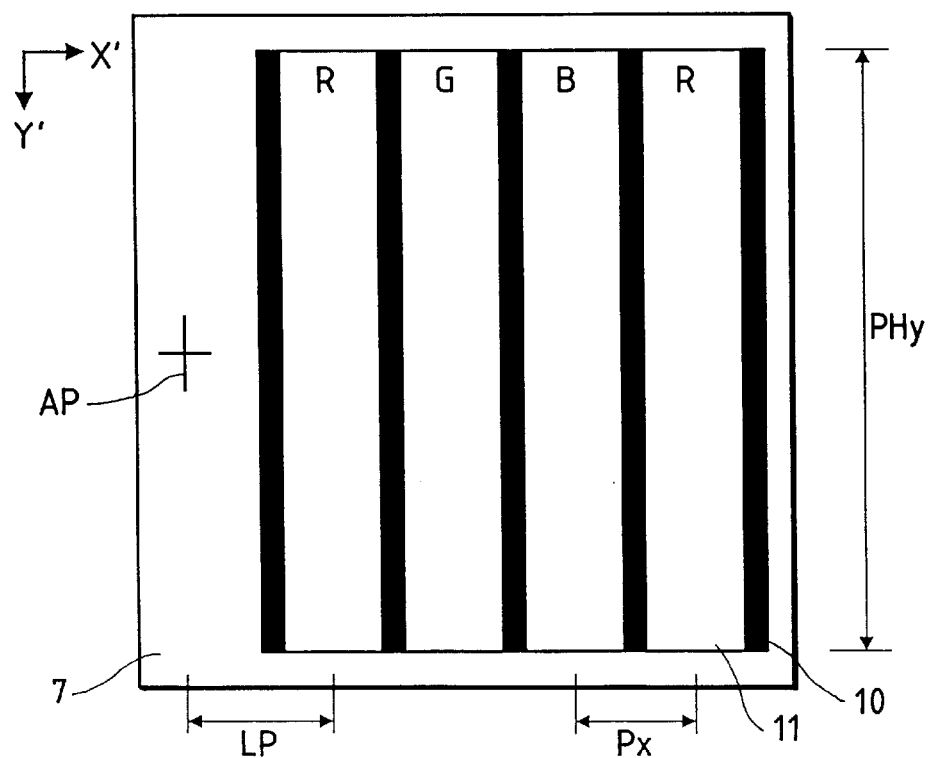

FIG. 1B is a schematic plan view of the face plate 7. Referring to FIG. 1B, denoted by 11 is a stripe of fluorescent substance extending in the Y'-direction. (Note that since FIG. 1B shows the plan as viewed from the display screen side of a display device, the stripes of fluorescent substances 11 and the black conductors 10 both formed on the lower surface of the face plate 7 are actually not appeared in the plan view, but are illustrated as if they were formed on the display screen side, for the purpose of explaining their set positions.) Further, although only four stripes of fluorescent substances are shown for convenience of illustration, a much larger number of the stripes of fluorescent substances are in fact formed as with the electron-emitting devices.

A rectangular mark AE formed on the substrate 1 and a crossed mark AP formed on the face plate 7 are alignment marks which are used as references for positioning the substrate 1 and the face plate 7 when they are sealed off, and for detecting a positional deviation between the substrate 1 and the face plate 7 after they have been sealed off. It is needless to say that the shape, number and positions of the alignment marks are not limited to the illustrated ones.

The substrate 1 is designed such that an X-direction coincides with the direction of lateral scan lines on the display screen and a Y-direction coincides with the direction of vertical scan lines on the display screen. Likewise, the face plate 7 is designed such that an X'-direction coincides with the direction of lateral scan lines on the display screen and a Y-direction coincides with the direction of vertical scan lines on the display screen. As mentioned before, however, it is difficult to assemble the substrate 1 and the face plate 7 with no positional deviation exactly as per design. The components are rarely assembled in complete agreement with the design values, but nearly all of panels actually assembled accompany with more or less positional deviations.

The set positions of the electron-emitting devices 2 and the stripes of fluorescent substances 11 will be described in more detail. The electron emitting devices 2 are arrayed at a pitch Px in the X-direction and at a pitch Py in the Y-direction. Similarly, the stripes of fluorescent substances 11 are arrayed at the pitch Px in the X'-direction. Values of the pitches Px and Py are set in match with a resolution required for the display device.

When assembling the display panel, the substrate 1 and the face plate 7 are positioned such that the cross of the alignment mark AP is just inscribed in the rectangle of the alignment mark AE. In this mark aligned condition, however, the stripes of fluorescent substances 11 are designed to be offset from the positions vertically above the corresponding electron-emitting devices 2. Specifically, a distance LE from the alignment mark AE to the nearest column of electron-emitting devices 2 in the X-direction and a distance LP from the alignment mark AP to the nearest stripe of fluorescent substance 11 are not equal to each other and are set to satisfy the relationship specified by Equation [1] below;

$$LP = LE + Lef \qquad [1]$$

where Lef is a numerical value determined depending upon such parameters as the drive voltage applied to the electron-emitting devices, the voltage applied to the stripes of fluorescent substances, and the distance between the electron-emitting device and the corresponding stripe of fluorescent substance. Although Lef will be described later in detail in connection with Equation [3], it represents, in short, a distance by which the electron beam emitted from each electron-emitting device deflects in the X-direction until reaching the stripe of fluorescent substance.

Also, a Y'-directional length PHy of the stripes of fluorescent substances 11 is set to be larger than a Y-directional length EBy of the region where the electron-emitting devices 2 are formed on the substrate 1:

$$EBy < PHy \qquad [2]$$

Satisfying above Equation [2] means that the edge lacking of the displayed image can be prevented even if the set positions of the stripes of fluorescent substances are deviated in the Y-direction. This point will be described later in detail with reference to FIG. 21. The value of PHy greater than that of EBy to a larger extent increases an allowance for the positional deviation of the stripes of fluorescent substances in the Y-direction. However, if PHy is too large, there would cause a disadvantage of overly enlarging the display panel on the contrary. It is therefore desirable that PHy be set to a minimum value within the allowable range to accommodate possible positional deviations based on results of statistically measuring (or estimating) the positional deviations in the Y-direction actually produced when the display panels are manufactured.

In view of the above, the relationship of $$PHy = 1.1 \times EBy$$

was set in this Embodiment 1.
(Preferable Structure and Manufacture Process oaf Electron-Emitting Devices)

The electron-emitting devices 2 formed on the substrate 1 shown in FIG. 1A are selected to have the following characteristics. The selected electron-emitting devices each generate an asymmetrical potential distribution in a space around its electron-emitting region with respect to a normal line extending from the substrate plane to the fluorescent film while passing the electron-emitting region under a driven state (i.e., a state where the drive voltage for emitting an electron beam is applied to the electron-emitting device).

These electron-emitting devices will be described in more detail with reference to FIGS. 4A and 4B.

Figure 4A:
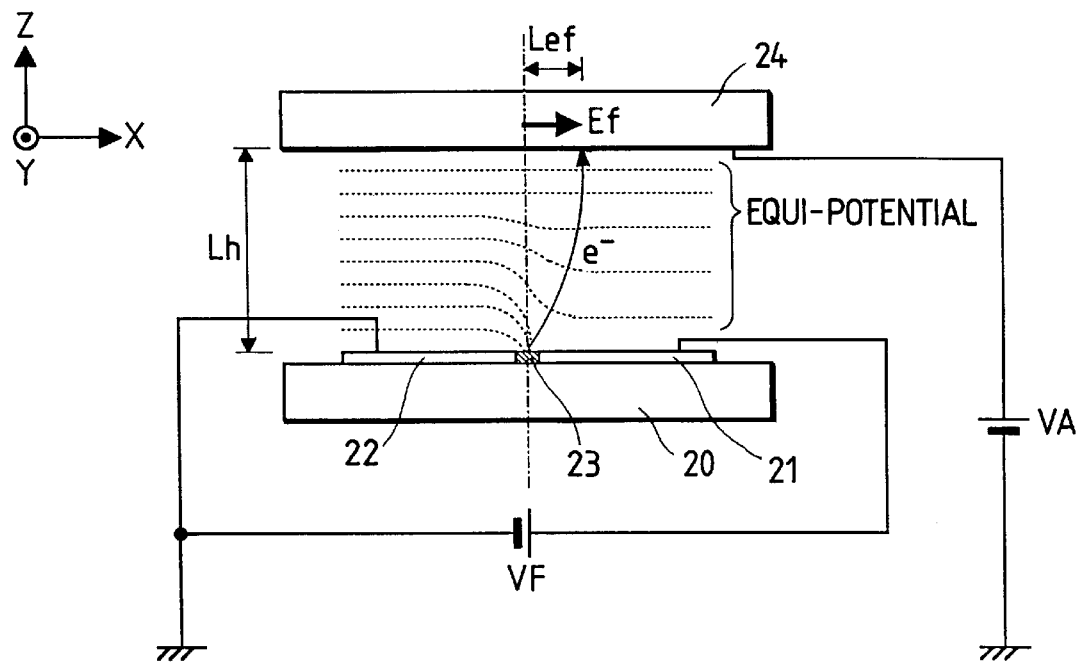
FIGS. 4A and 4B are a sectional and plan view, respectively, showing the path of an electron beam emitted from an electron-emitting device used in the present invention.
Figure 4B:
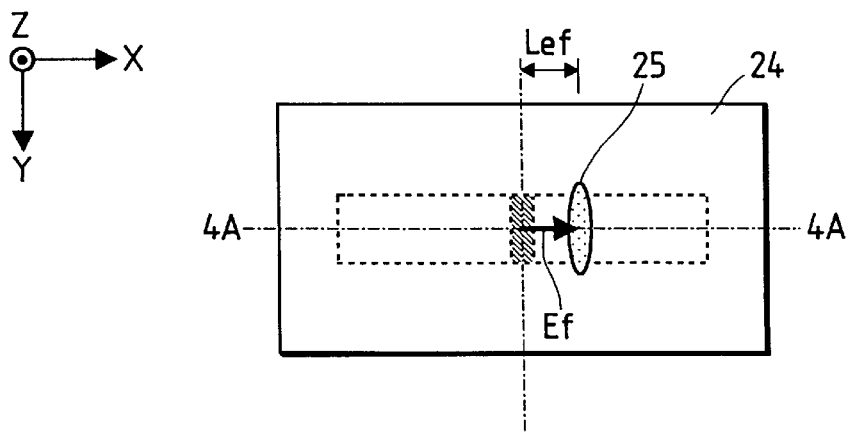
Figure 20:
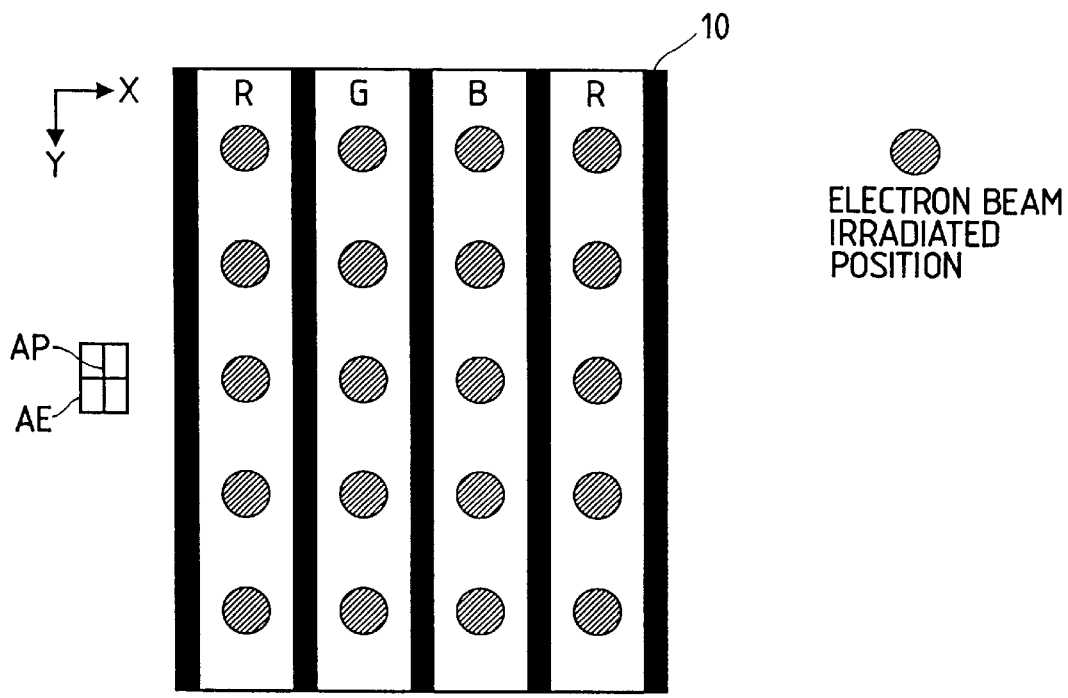
FIG. 20 is a plan view showing positions irradiated by electron beams when electron-emitting devices and stripes of fluorescent substances are assembled with no positional deviation therebetween.

FIG. 4A is a sectional view for explaining the electron-emitting device used in the present invention. In FIG. 4A, 20 is a substrate on which the electron-emitting device is formed, 21 is a positive electrode of the electron-emitting device, 22 is a negative electrode of the electron-emitting device, 23 is an electron-emitting region of the electron-emitting device, 24 is an electron beam target, VF is a power supply for applying a drive voltage Vf V to the electron-emitting device, and VA is a power supply for applying a target voltage Va V to the target 24. (In an actual image display device, the target 24 is formed of a fluorescent substance. Generally, there holds a relationship of Va>Vf.)

The electron-emitting device for use in the present invention includes, as constituent members, at least the positive electrode 21, the negative electrode 22 and the electron-emitting region 23. These constituent members are formed side by side on an upper surface of the substrate 20. (In the following description, the upper surface of the substrate 20 will be referred to as substrate plane.)

Figure 30:
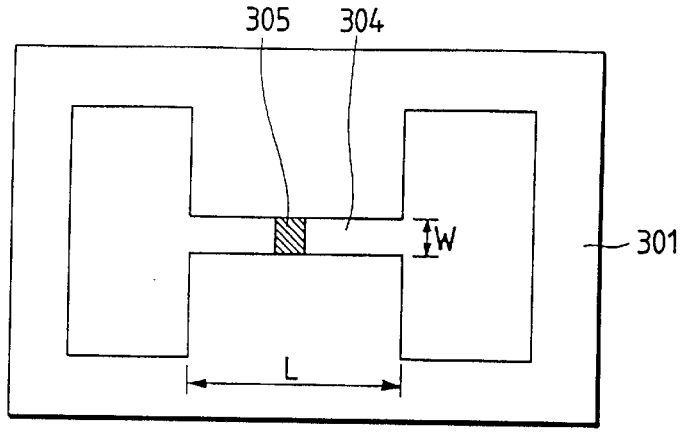
FIG. 30 is a plan view showing one example of a conventionally known surface conduction electron-emitting device.
Figure 31:
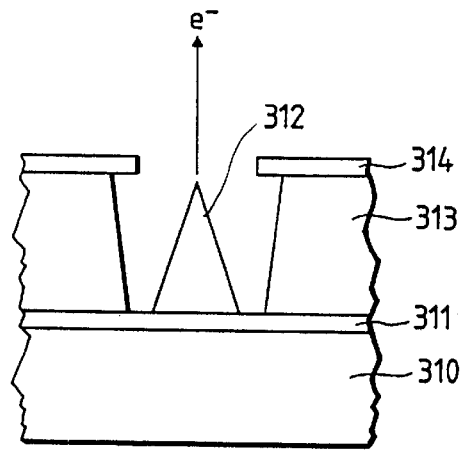
FIG. 31 is a sectional view showing one example of a conventionally known FE electron-emitting device.
Figure 32:
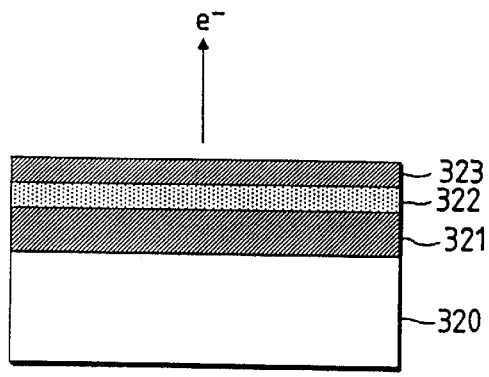
FIG. 32 is a sectional view showing one example of a conventionally known MIM electron-emitting device.

For example, the electron-emitting devices shown in FIGS. 31 and 32 have their constituent members laminated on the substrate plane in the vertical direction, and hence they do not correspond to the above-mentioned type electron-emitting device in which the constituent members are arranged side by side on the substrate plane. On the other hand, the electron-emitting device shown in FIG. 30 corresponds to the above-mentioned type electron-emitting device.

In the electron-emitting device shown in FIG. 4A, an electron beam emitted from the electron-emitting region 23 generally has a component of initial velocity directing toward the positive electrode 21 from the negative electrode 22. Accordingly, the electron beam does not travel in a direction perpendicular to the substrate plane.

In addition, for such an electron-emitting device, since the positive electrode 21 and the negative electrode 22 are disposed on the substrate plane side by side, the potential distribution created in a space above the electron-emitting region 23 upon application of the drive voltage becomes asymmetrical with respect to a line extending vertically to the substrate plane while passing the electron-emitting region 23 (i.e., a one-dot-chain line in FIG. 4A). The potential distribution between the electron-emitting device and the target 24 is indicated by dotted lines in FIG. 4A. As shown, while the equi-potential plane is substantially parallel to the substrate plane near the target 24, it is inclined under an effect of the drive voltage Vf V near the electron-emitting device.

Therefore, the electron beam emitted from the electron-emitting region 23 is subjected to not only force in the Z-direction, but also force in the X-direction due to the inclined potential while it is flying through the space above the substrate. The resultant path of the electron beam is curved as shown.

For the above two reasons, the position where the electron beam irradiates the target 24 is deviated a distance Lef in the X-direction from the position on the target 24 that is perpendicular to or right above the electron-emitting region. FIG. 4B is a plan view of the target 24 as viewed from above. In FIG. 4B, an ellipse denoted by 25 symbolically represents the position irradiated by the electron beam on the underside of the target. (Note that FIG. 4A shows a vertical section taken along one-dot-chain line 4A—4A in FIG. 4B.)

To represent in a general formula how the position irradiated by the electron beam is deviated from the position perpendicularly above the electron-emitting region on the target 24, the direction and distance of the resulting deviation are expressed by using a vector Ef for the sake of convenience.

First, it can be said that the direction of the vector Ef is the same as the direction in which the negative electrode, the electron-emitting region and the positive electrode of the electron-emitting device are arranged side by side on the substrate plane. In the case of FIGS. 4A and 4B, for example, because the negative electrode 22, the electron-emitting region 23 and the positive electrode 21 of the electron-emitting device are successively arranged in the X-direction on the substrate 20 in this order, the vector Ef is pointed in the X-direction.

Figure 5A:
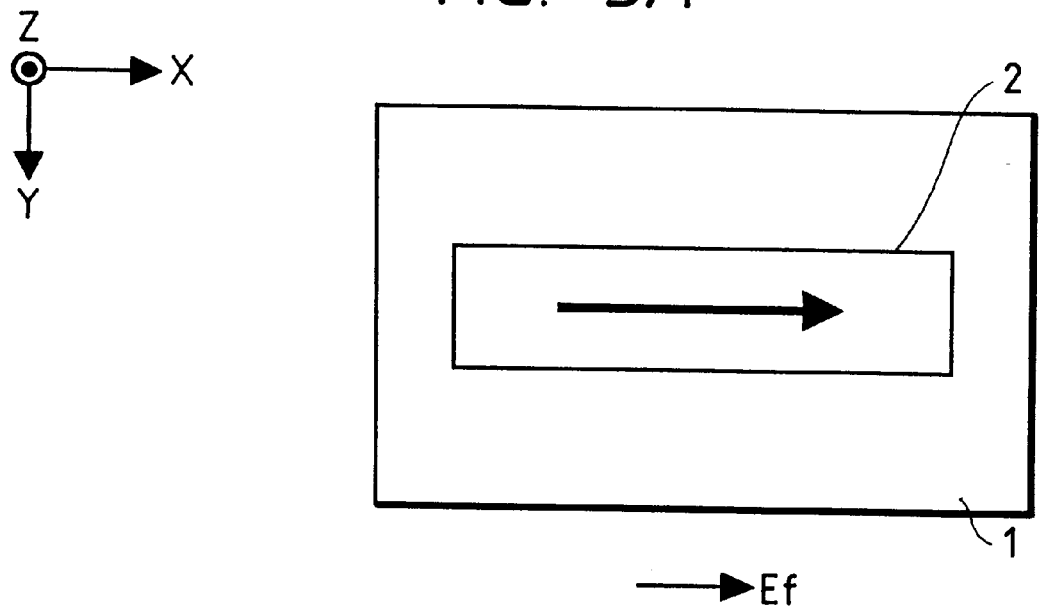
FIGS. 5A and 5B are schematic views each showing the direction in which an electron-emitting device is formed.
Figure 5B:
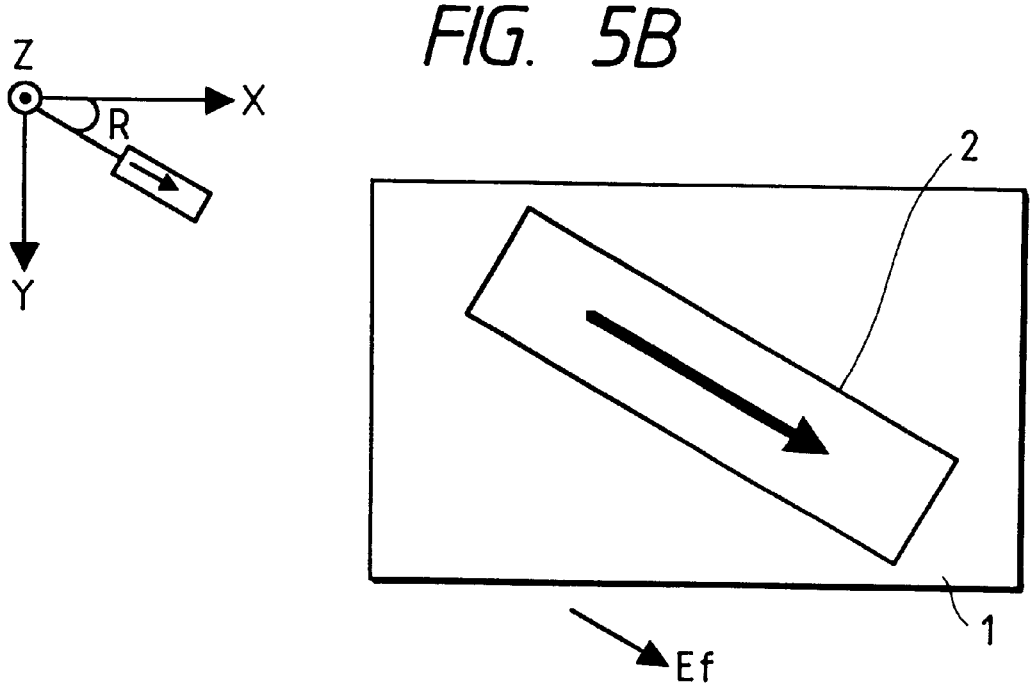

For the purpose of indicating the direction in which the electron-emitting device is formed on the substrate plane and the direction of the vector Ef on the drawing, it is assumed that those directions are symbolically indicated in such a manner as illustrated in FIGS. 5A and 5B. FIG. 5A shows an example in which the negative electrode, the electron-emitting region and the positive electrode of the electron-emitting device 2 are arranged on the substrate 1 side by side in the X-direction, and FIG. 5B shows an example in which they are arranged on the substrate side by side in a direction inclined an angle R from the X-direction.

Then, the magnitude of the vector Ef (i.e., Lef) depends on the distance Lh between the electron-emitting device and the target, the drive voltage Vf applied to the electron-emitting device, the potential Va of the target, and the type and configuration of the electron-emitting device, but its approximate value can be calculated from Equation [3] below;

$$Lef = 2 \times K \times Lh \times \sqrt{\frac{Vf}{Va}} \ [m] \qquad [3]$$

where

Lh (m) is the distance between the electron-emitting device and the target,

Vf (V) is the drive voltage applied to the electron-emitting device,

Va (V) is the voltage applied to the target, and

K is the constant determined depending upon the type and configuration of the electron-emitting device.

In calculating an approximate value from Equation [3], K1 is put in Equation [3] when the type and configuration of the electron-emitting device used are unknown.

When the type and configuration of the electron-emitting device are known, the constant K of the electron-emitting device is determined by experiments or simulation using a computer.

To determine Lef with higher accuracy, it is desired that K be set to not a constant, but a function of Vf. In most cases, however, using a constant as K is sufficient for the accuracy required in design of image display devices.

The structure and manufacture process will be described below in more detail.

As described above, the electron-emitting device for use in the present invention includes, as constituent members, a positive electrode, an electron-emitting region and a negative electrode, these members being formed side by side on the substrate plane. (Note that part of the negative electrode of the device may double as the electron-emitting region.)

The electron-emitting device meeting such requirements includes, e.g., a surface conduction electron-emitting device and a lateral field-effect electron-emitting device. These electron-emitting devices will be described below in this order.

The surface conduction electron-emitting device is of, e.g., the above-mentioned type shown in FIG. 30 or the type including fine particles near an electron-emitting region. As to the former type, there are already known electron-emitting devices using a variety of materials, as described in connection with the Related Background Art, all of these devices being suitable for use in the present invention. As to the latter type, while materials, structures and manufacture processes of electron-emitting devices will be described later, all kinds of devices are suitable for use in the present invention. In other words, when using surface conduction electron-emitting devices to carry out the present invention, there are no particular limits in materials, structures and manufacture processes of the devices.

Figure 6A:
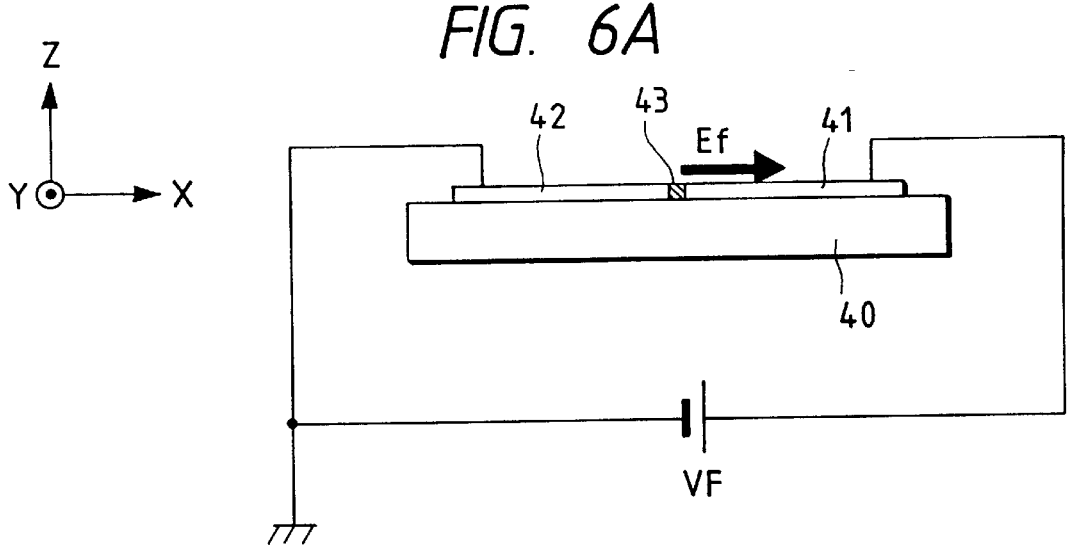
FIGS. 6A and 6B are a sectional and plan view, respectively, for defining the direction of a surface conduction electron-emitting device.
Figure 6B:
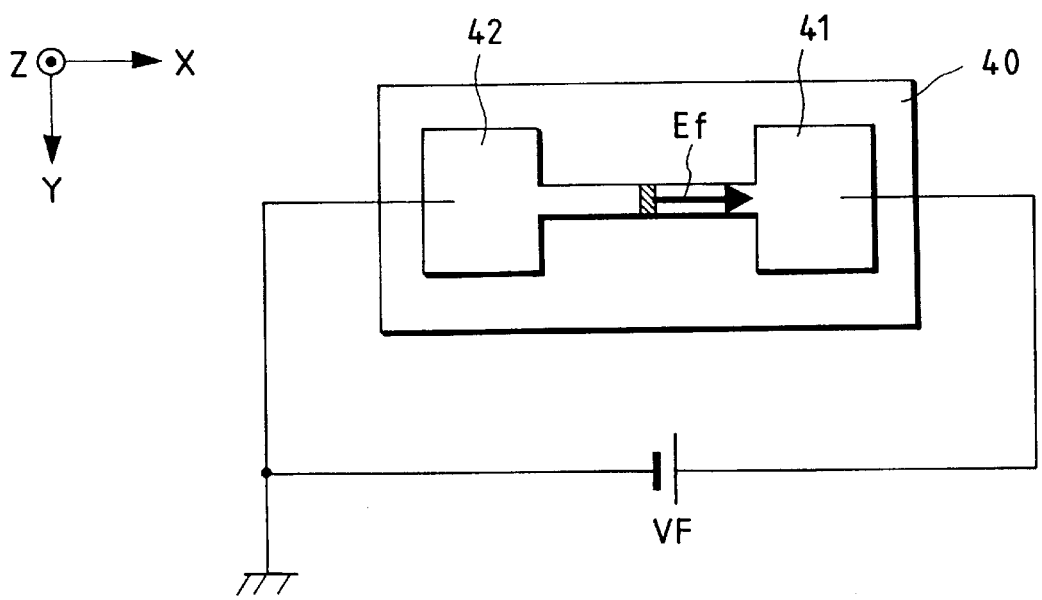

For the surface conduction electron-emitting device, the vector Ef indicating the direction in which an electron beam is deviated is expressed as shown in FIGS. 6A and 6B which are a sectional and plan view, respectively. In these drawings, denoted by 40 is a substrate, 41 is a positive electrode, 42 is a negative electrode, 43 is an electron-emitting region, and VF is a power supply for applying a drive voltage to the device.

Next, the lateral field-effect electron-emitting device means, particularly, the type of field-effect electron-emitting device in which a negative electrode, an electron-emitting region and a positive electrode are disposed side by side on the substrate plane. The above-mentioned device shown in FIG. 31, for example, does not belong to the lateral type because it has a negative electrode, an electron-emitting region and a positive electrode vertically disposed with respect to the substrate plane. On the other hand, electron-emitting devices illustrated in FIGS. 7A to 7C belong to the lateral type. FIGS. 7A to 7C are perspective views showing typical examples of the lateral field-effect electron-emitting device which is formed on the substrate plane in the X-direction. In these drawings, denoted by 50 is a substrate, 51 is a positive electrode, 52 is a negative electrode, and 53 is an electron-emitting region. The lateral field-effect electron-emitting device may have other various configurations than illustrated in FIGS. 7A to 7C.

Thus, so long as the path of an electron beam is deviated from the vertical direction as described above with reference to FIGS. 4A and 4B, any kinds of lateral field-effect electron-emitting devices are suitable for use in the present invention. For example, therefore, the electron-emitting devices of FIGS. 7A to 7C may be each modified to additionally have a modulation electrode for modulating the intensity of an electron beam. Also, the electron-emitting region 53 may be formed by part of the negative electrode 52, or may be formed of a member disposed above the negative electrode. Materials used for the electron-emitting region of the lateral field-effect electron-emitting device includes, e.g., metals having the melting points and diamond. However, any other materials which are capable of satisfactorily emitting electrons can also be employed.

Figure 8A:
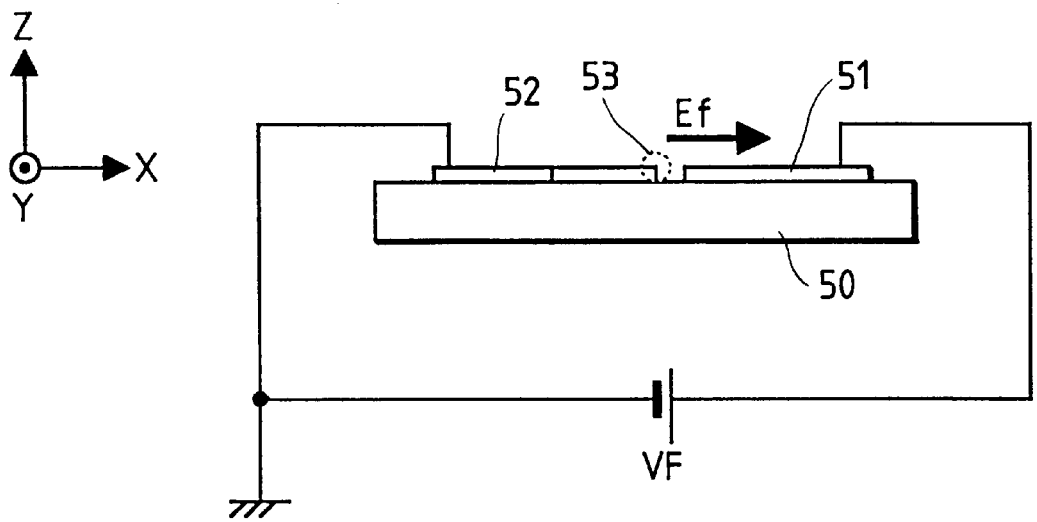
FIGS. 8A and 8B are a sectional and plan view, respectively, for defining the direction of the lateral field-effect electron-emitting device.
Figure 8B:
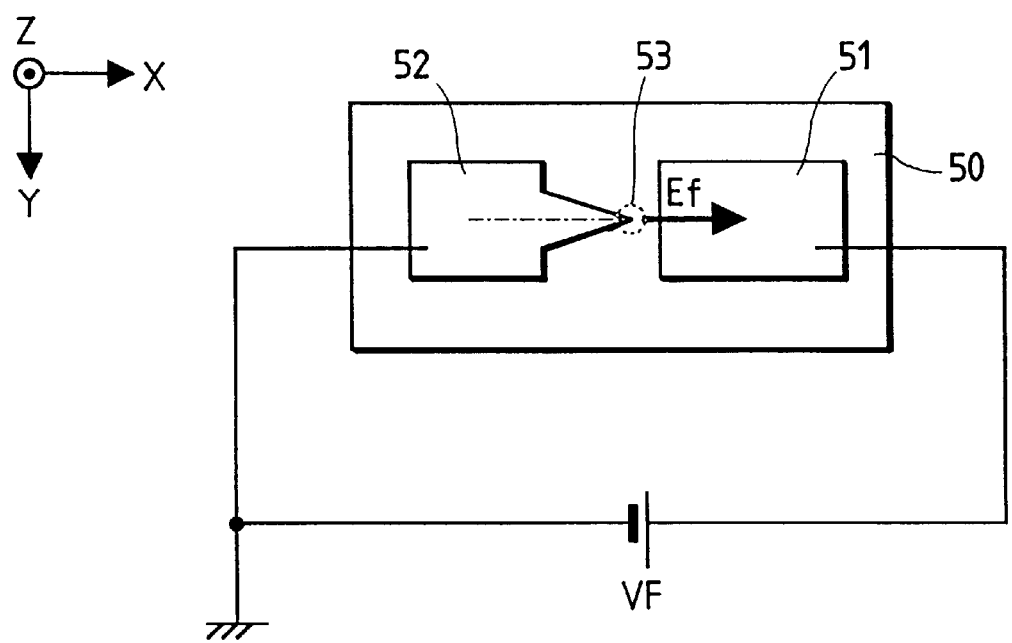

For the lateral field-effect electron-emitting device, the vector Ef indicating the direction in which an electron beam is deviated is expressed as shown in FIGS. 8A and 8B which are a sectional and plan view, respectively. In these drawings, denoted by 50 is a substrate, 51 is a positive electrode, 52 is a negative electrode, 53 is an electron-emitting region, and VF is a power supply for applying a drive voltage to the device.

While the electron-emitting devices suitable for use in the present invention have been described above, the image display device of this Embodiment 1 employs surface conduction electron-emitting devices.

The surface conduction electron-emitting devices employed in the display panel of this Embodiment 1 will now be described. The inventors have found that a surface conduction electron-emitting device of the type having an electron-emitting region or its vicinity formed of a fine particle film is superior in electron-emitting characteristics and is easy to design and manufacture. It can be thus said that the above type of surface conduction electron-emitting device is optimum for use with a multi-electron beam source of image display devices having a large-sized screen and a high luminance. In view of the above finding, the inventors have tried to fabricate a display panel using planar type surface conduction electron-emitting devices formed by fine particle films, and obtained very good results. Also, very good results were obtained for a display panel fabricated using step type surface conduction electron-emitting devices formed by fine particle films. Therefore, planar and step type surface conduction electron-emitting devices formed by fine particle films will be described below in detail.

Planar Type Surface Conduction Electron-Emitting Device

A description will first be made of the construction and manufacture process of the planar type surface conduction electron-emitting device.

Figure 9A:
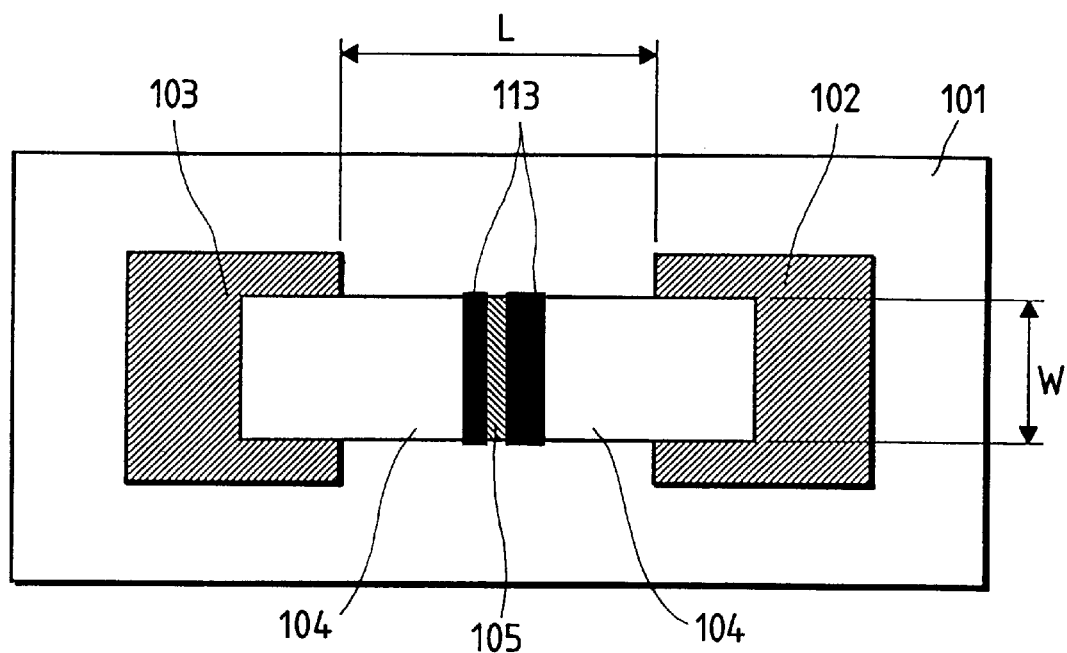
FIGS. 9A and 9B are a sectional and plan view, respectively, of a planar type surface conduction electron-emitting device used in the embodiment.
Figure 9B:
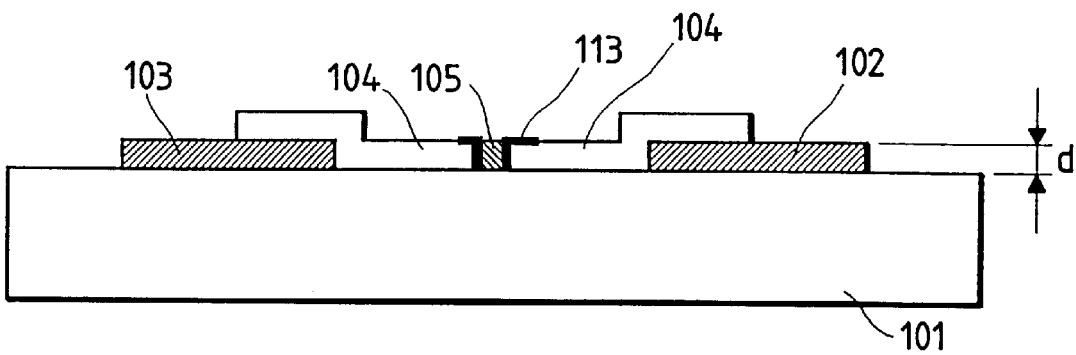

FIGS. 9A and 9B are a plan and sectional view, respectively, for explaining the construction of the planar type surface conduction electron-emitting device. In these drawings, denoted by 101 is a substrate, 102 is a positive electrode, 103 is a negative electrode, 104 is a conductive thin film, 105 is an electron-emitting region formed by a process of forming by energization, and 113 is a thin film formed by a process of activating by energization.

The substrate 101 may be any of various glass substrates made of, e.g., quartz glass and soda lime glass, various ceramic substrates made of, e.g., alumina, and those substrates having insulating layers made of, e.g., $SiO_2$ and laminated thereon.

The positive electrode 102 and the negative electrode 103 disposed on the substrate 101 in opposite relation parallel to the substrate plane are each made of a material which has conductivity. The electrode material can be selected from, for example, metals such as Ni, Cr, Au, Mo, W, Pt, Ti, Cu, Pd and Ag or alloys thereof, metal oxides such as $In_2O_3$—$SnO_2$, and semiconductor such as polysilicon. The electrodes can be easily formed by e.g., combination of the film-forming technique such as vacuum evaporation and the patterning technique such as photolithography and etching. However, the electrodes may be formed by using any other suitable method (e.g., printing).

The configurations of the positive electrode 102 and the negative electrodes 103 are appropriately designed in conformity with the purpose of the electron-emitting device to be applied. Generally, the spacing L between both the electrodes is designed by selecting an appropriate value in the range of several hundreds angstroms to several hundreds microns. Above all, the preferable range for application to display devices is from several microns to several tens microns. The thickness d of each electrode is usually set to an appropriate value in the range of several hundreds angstroms to several microns.

The conductive thin film 104 comprises a fine particle film. The term "fine particle film" used herein means a film comprising a number of fine particles (including their aggregations in an island state) as constituent elements. Looking at the fine particle film microscopically, the structure in which individual fine particles are dispersed away from each other, or adjacent to each other, or overlapped with each other is generally observed.

The size of fine particles used for the fine particle film is in the range of several angstroms to several thousands angstroms, preferably 10 angstroms to 200 angstroms. Also, the thickness of the fine particle film is suitably set in consideration of various conditions; i.e., conditions required to achieve good electrical connection to the electrodes 102 and 103, conditions required to conduct the forming by energization (described later) in a satisfactory manner, and conditions required to maintain electric resistance of the fine particle film itself at an appropriate value (described later). Specifically, the thickness of the fine particle film is set to fall in the range of several angstroms to several thousands angstroms, more preferably 10 angstroms to 500 angstroms.

A material used to form the fine particle film can be suitably selected from, for example, metals such as Pd, Pt, Ru, Ag, Au, Ti, In, Cu, Cr, Fe, Zn, Sn, Ta, W and Pb, oxides such as PdO, $SnO_2$, $In_2O_3$, PbO and $Sb_2O_3$, borides such as $HfB_2$, $ZrB_2$, $LaB_6$, $CeB_6$, $YB_4$ and $GdB_4$, carbides such as TiC, ZrC, HfC, TaC, SiC and WC, nitrides such as TiN, ZrN and HfN, semiconductors such as Si and Ge, and carbon.

The conductive thin film 104 is formed of a fine particle film as described above, and its sheet resistance value is set to fall in the range of $10^3$ to $10^7$ ohms/□.

Since the conductive thin film 104 is desired to establish satisfactory electrical connection to the positive electrode 102 and the negative electrode 103, the thin film and the electrodes are partly overlapped with each other. In the example shown in FIGS. 9A and 9B, the substrate, the positive and negative electrodes, and the conductive thin film are laminated in this order from below so as to provide the overlapped structure. In some cases, the substrate, the conductive thin film, and the positive and negative electrodes may be laminated in this order from below.

The electron-emitting region 105 is a fissured portion formed in part of the conductive thin film 104, and has a higher resistance than the conductive thin film surrounding it in terms of electrical properties. The fissure is created by subjecting the conductive thin film 104 to a process of forming by energization (described later). Fine particles having the size in the range of several angstroms to several hundreds angstroms may be dispersed in the fissure. Note that the position and shape of the electron-emitting region are schematically illustrated in FIGS. 9A and 9B because of difficulties in drawing the actual ones precisely and exactly.

The thin film 113 is a thin film made of carbon or carbon compounds, and are positioned so as to partly cover the electron-emitting region 105 and the vicinity thereof. The thin film 113 is formed by a process of activating by energization (described later) conducted after the process of forming by energization.

The thin film 113 is made of any of single-crystal graphite, polycrystalline graphite and amorphous carbon, or a mixture thereof. The film thickness is selected to be not larger than 500 angstroms, more preferably not larger than 300 angstroms.

Note that the position and shape of the thin film 113 is schematically illustrated in FIGS. 9A and 9B because of difficulties in drawing the actual one precisely and exactly. Incidentally, in the device shown in the plan view of FIG. 9A, the thin film 113 is partly removed.

While the preferable basic construction of the device has been described above, the device used in this Embodiment was designed as follows.

The substrate 101 was formed of a soda lime glass, and the positive and negative electrodes 102, 103 were each formed of an Ni thin film. The electrode thickness d was set to 1000 angstroms and the electrode spacing L was set to 2 microns.

The fine particle film was formed of Pd or PdO as a primary material, and was coated to have a thickness of about 100 angstroms and a width W of 100 microns.

Next, a preferable manufacture process for the planar type surface conduction electron-emitting device will be described below.

FIGS. 10A to 10E are sectional views for explaining successive manufacture steps of the planar type surface conduction electron-emitting device. In these drawings, the component members are denoted by the same reference numerals as used in FIGS. 9A and 9B.

Figure 10A:
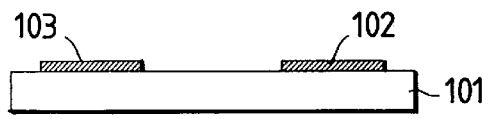
FIGS. 10A to 10E are sectional views showing successive manufacture steps of the planar type surface conduction electron-emitting device.

1) First, as shown in FIG. 10A, the positive and negative electrodes 102, 103 are formed on the substrate 101.

Prior to forming the electrodes, the substrate 101 is sufficiently washed with a detergent, pure water and an organic solvent. An electrode material is then deposited on the substrate (by any of vacuum film-forming techniques such as vacuum evaporation and sputtering). The deposited electrode material is then patterned by photolithography etching to form a pair of electrodes (102 and 103) as shown in FIG. 10A.

Figure 10B:
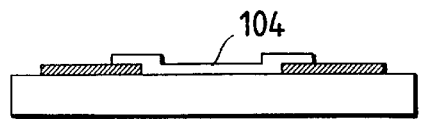

2) Next, the conductive thin film 104 is formed as shown in FIG. 10B.

To form the conductive thin film 104, an organic metal solution is coated and dried over the substrate shown in FIG. 10A, and then subjected to a heating/baking process to form a fine particle film. Thereafter, the fine particle film is patterned by photolithography etching into a predetermined shape. Here, the organic metal solution is a solution of an organic metal compound containing, as a primary element, a material of fine particles used to form the conductive thin film. (Specifically, Pd was used in this Embodiment as a primary element. The solution was coated by dipping of the substrate in this Embodiment, but it may be coated by any other suitable method such as spinning or spraying.)

Rather than coating an organic metal solution as carried out in this Embodiment, conductive thin film comprising a fine particle film may be formed by any other suitable method such as vacuum evaporation, sputtering, or chemical vapor-phase deposition.

Figure 10C:
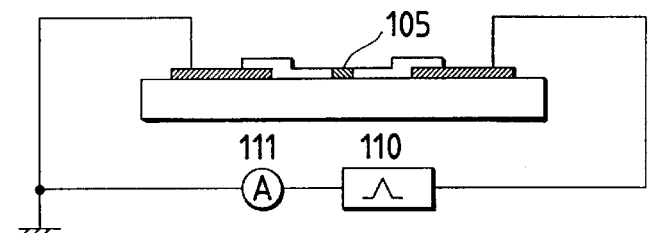

3) Subsequently, as shown in FIG. 10C, an appropriate voltage is applied between the positive and negative electrodes 102, 103 from a forming power supply 110 to carry out the process of forming by energization so that the electron-emitting region 105 is formed.

Here, the process of forming by energization means a process of energizing the conductive thin film 104 formed of a fine particle film to properly destroy, deform or denature part of the film 104 for transformation into the structure suitable for emitting electrons. In a portion of the conductive thin film formed of a fine particle film which has been transformed into the structure suitable for emitting electrons (i.e., in the electron-emitting region 105), there produces an appropriate fissure. As compared with the state prior to formation of the electron-emitting region 105, the electric resistance measured between the positive and negative electrodes 102, 103 is much increased in the state after formation thereof.

Figure 11:
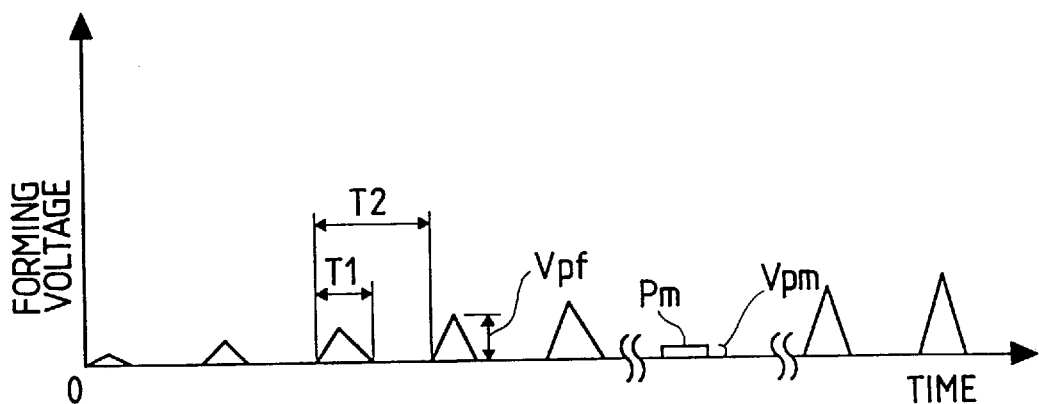
FIG. 11 is a chart showing waveforms of voltages applied in the process of forming by energization.

To describe the energizing method in more detail, FIG. 11 shows one example of voltage waveforms suitably applied from the forming power supply 110. When subjecting the conductive thin film formed of a fine particle film to the process of forming by energization, it is preferable to apply a pulse-like voltage. In this Embodiment, as shown in FIG. 11, a triangular pulse having a pulse width T1 was applied successively with a pulse interval T2. At the same time, a crest value Vpf of the triangular pulse was raised gradually. Further, a monitor pulse Pm for monitoring the situation of the electron-emitting region 105 being formed was inserted among the triangular pulses with a proper interval, and a current flowing upon application of the monitor pulse was measured by an ammeter 111.

In this Embodiment, under a vacuum atmosphere on the order of $10^{-5}$ Torr, the pulse width T1 was set to 1 millisecond, the pulse interval T2 was set to 10 milliseconds, and the crest value Vpf was raised at a rate of 0.1 V per pulse. Further, the monitor pulse Pm was inserted each time five triangular pulses were applied. In order for the forming process to not be adversely affected, a voltage Vpm of the monitor pulse was set to 0.1 V. Then, the energization for the forming process was terminated when the electric resistance between the positive and negative electrodes 102, 103 reached $1 \times 10^6$ ohms, i.e., when the current measured by the ammeter 111 upon application of the monitor pulse was reduced down below $1 \times 10^{-7}$ A.

The above-described method is preferable for the surface conduction electron-emitting device of this Embodiment. When the design of the surface conduction electron-emitting device is changed in, e.g., the material and thickness of the fine particle film or the electrode spacing L, it is desired that the energizing conditions be properly varied correspondingly.

Figure 10D:
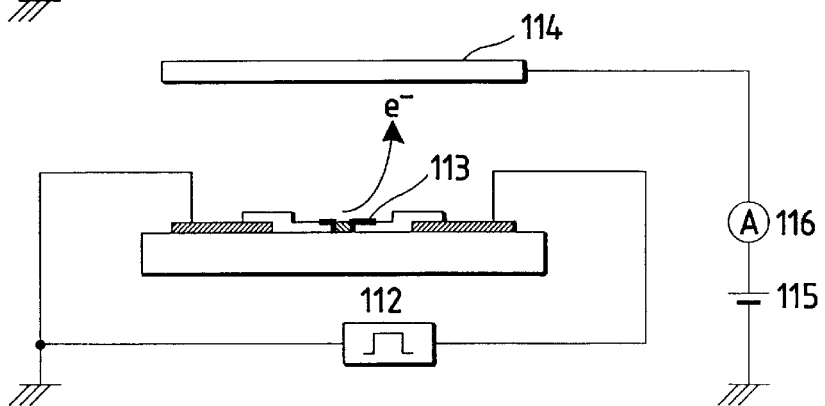

4) Then, as shown in FIG. 10D, an appropriate voltage is applied between the positive and negative electrodes 102, 103 from an activating power supply 112 to carry out the process of activating by energization so that electron-emitting characteristics are improved.

Here, the process of activating by energization means a process of energizing the electron-emitting region 105, which has been formed by the above process of forming by energization, under proper conditions to deposit carbon or carbon compounds in the vicinity of the region 105. (In FIG. 10D, deposits of carbon or carbon compounds are schematically shown as the thin film 113.) As compared with the state prior to the process of activating by energization, an emission current at the same voltage applied can be typically increased 100 times or more in the state after the activating process.

Specifically, a voltage pulse is periodically applied to the electron-emitting region 105 under a vacuum ranging from $10^{-4}$ to $10^{-5}$ Torr so that carbon and carbon compounds are deposited originating from organic compounds present in the vacuum atmosphere. The deposits 113 are formed of any of single-crystal graphite, polycrystalline graphite and amorphous carbon, or a mixture thereof. The deposit thickness is selected to be not larger than 500 angstroms, more preferably not larger than 300 angstroms.

Figure 12A:
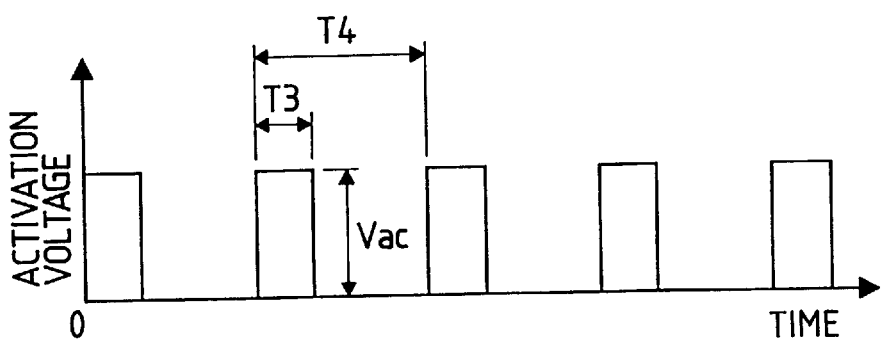
FIGS. 12A and 12B are charts showing respectively the waveform of a voltage applied in the process of activating by energization and changes in an emission current Ie.

To describe the energizing method in more detail, FIG. 12A shows one example of voltage waveforms suitably applied from the activating power supply 112. In this Embodiment, the process of activating by energization was carried out by periodically applying a constant voltage of rectangular waveform. Specifically, the voltage Vac of rectangular waveform was set to 14 V, the pulse width T3 was set to 1 millisecond, and the pulse interval T4 was set to 10 millisecond. These energizing conditions are preferable for the surface conduction electron-emitting device of this Embodiment. When the design of the surface conduction electron-emitting device is changed, it is desired that the energizing conditions be properly varied correspondingly.

Denoted by 114 in FIG. 10D is an anode electrode for capturing an emission current Ie emitted from the surface conduction electron-emitting device. A DC high-voltage power supply 115 and an ammeter 116 are connected to the anode electrode 114. (When the activating process is carried out after building the substrate 101 into the display panel, the fluorescent film of the display panel is employed as the anode electrode.)

Figure 12B:
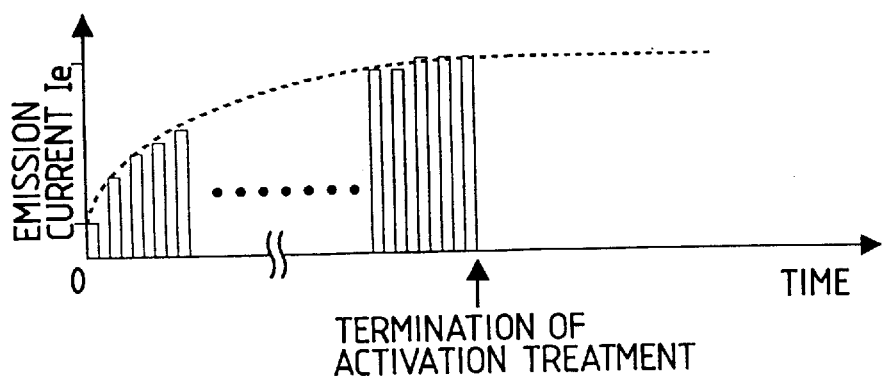

While the activating power supply 112 is applying the pulse voltage to the device, the emission current Ie is measured by the ammeter 116 to monitor the progress of the activating process for controlling the operation of the activating power supply 112. FIG. 12B shows one example of the emission current Ie measured by the ammeter 116. As shown, when the activating power supply 112 starts to apply the pulse voltage, the emission current Ie is increased over time, but it is saturated so as not to further increase after a certain period of time. At the time the emission current Ie is substantially saturated, the activating power supply 112 stops applying the pulse voltage and the process of activating by energization is ended.

These energizing conditions are preferable for the surface conduction electron-emitting device of this Embodiment. When the design of the surface conduction electron-emitting device is changed, it is desired that the energizing conditions be properly varied correspondingly.

Figure 10E:
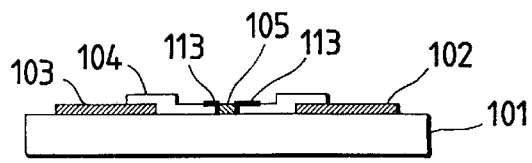

Eventually, the planner type surface conduction electron-emitting device shown in FIG. 10E is manufactured.

Step Type Surface Conduction Electron-Emitting Device

A description will now be made of another typical construction of the surface conduction electron-emitting device of the type having an electron-emitting region or its vicinity formed of a fine particle film, i.e., the construction of a step type surface conduction electron-emitting device.

Figure 13:
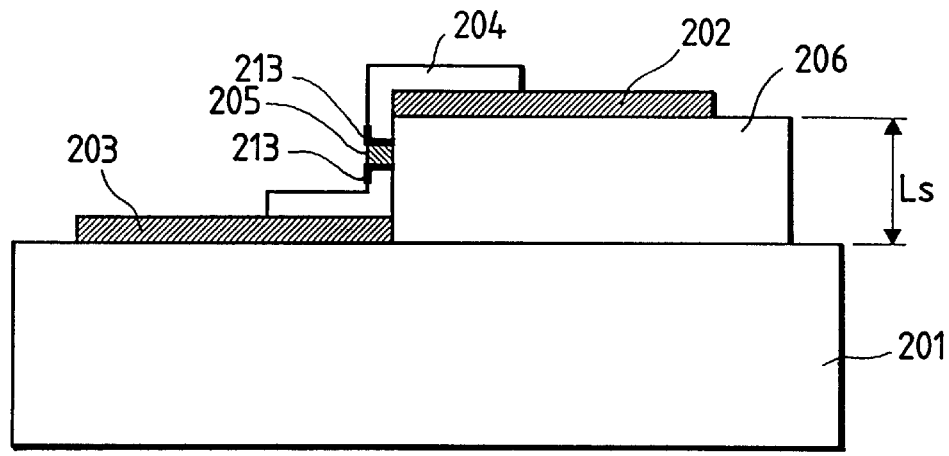
FIG. 13 is a sectional view of a step type surface conduction electron-emitting device used in the embodiment.

FIG. 13 is a schematic sectional view for explaining the basic construction of the step type surface conduction electron-emitting device. In the drawing, denoted by 201 is a substrate, 202 is a positive electrode, 203 is a negative electrode, 206 is a step-forming section, 204 is a conductive thin film comprising a fine particle film, 205 is an electron-emitting region formed by the process of forming by energization, and 213 is a thin film formed by the process of activating by energization.

The step type device is different from the above-described planar type device in that the positive electrode 202 is disposed on the step forming section 206 and the conductive thin film 204 covers a side face of the step forming section 206. Therefore, the electrode spacing L in the planar type device of FIGS. 9A and 9B is set as a step height Ls of the step forming section 206 in the step type device. The substrate 201, the positive electrode 202, the negative electrode 203, and the conductive thin film 204 comprising a fine particle film can be formed by using any of the materials cited above in the description of the planar type device. The step forming section 206 is formed of, e.g., an electrically insulating material such as $SiO_2$.

The manufacture process of the step type surface conduction electron-emitting device will be described below. FIGS. 14A to 14F are sectional views for explaining successive manufacture steps. In these drawings, the component members are denoted by the same reference numerals as used in FIG. 13.

Figure 14A:
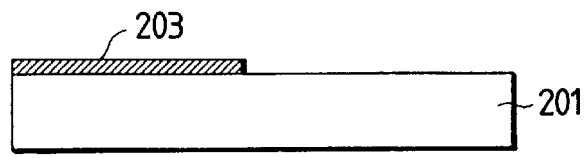
FIGS. 14A to 14F are sectional views showing successive manufacture steps of the step type surface conduction electron-emitting device.

1) First, as shown in FIG. 14A, the negative electrode 203 is formed on the substrate 201.

Figure 14B:
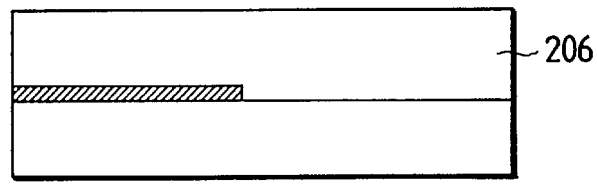

2) Then, as shown in FIG. 14B, an insulating layer used to form the step forming section 206 is laminated thereon. The insulating layer is formed of $SiO_2$ by sputtering, for example. Any other suitable film-forming method such as vacuum evaporation or printing may also be used instead.

Figure 14C:
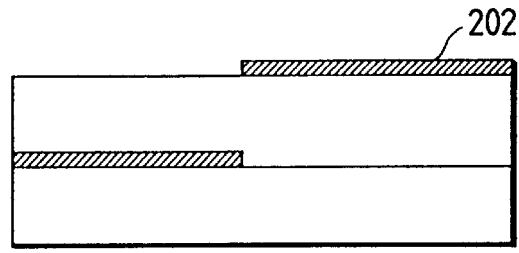

3) Then, as shown in FIG. 14C, the positive electrode 202 is formed on the insulating layer.

Figure 14D:
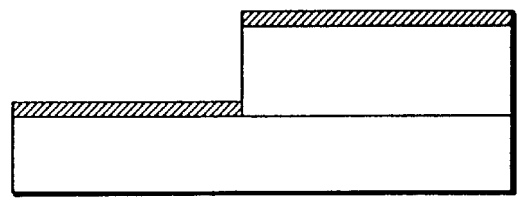

4) Then, as shown in FIG. 14D, part of the insulating layer is removed by, e.g., etching to make the negative electrode 203 exposed.

Figure 14E:
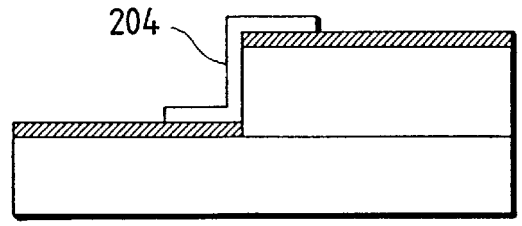

5) Then, as shown in FIG. 14E, the conductive thin film 204 comprising a fine particle film is formed.

Forming the conductive thin film 204 is carried out by sing the film-forming technique such as coating as with the case of the planar type device.

6) Then, as with the case of the planar type device, the process of forming by energization is carried out to form the electron-emitting region. (This forming process can be made in a similar manner as that described above with reference to FIG. 10C.)

7) Then, as with the case of the planar type device, the process of activating by energization is carried out to deposit carbon or carbon compounds in the vicinity of the electron-emitting region. (This activating process can be made in a similar manner as that described above with reference to FIG. 10D.)

Figure 14F:
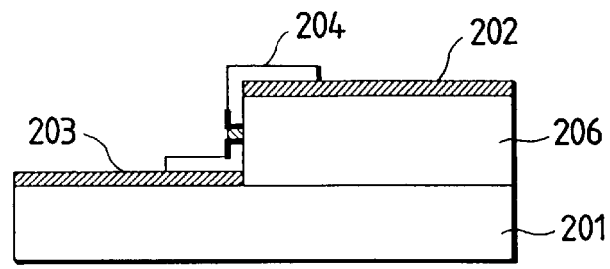

Eventually, the step type surface conduction electron-emitting device shown in FIG. 14F is manufactured.

(Characteristics of Surface Conduction Electron-Emitting Device Used in Display Device)

While the constructions and manufacture processes of the planar and step type surface conduction electron-emitting devices have been described above, characteristics of these devices used in the display device will be described below.

Figure 15:
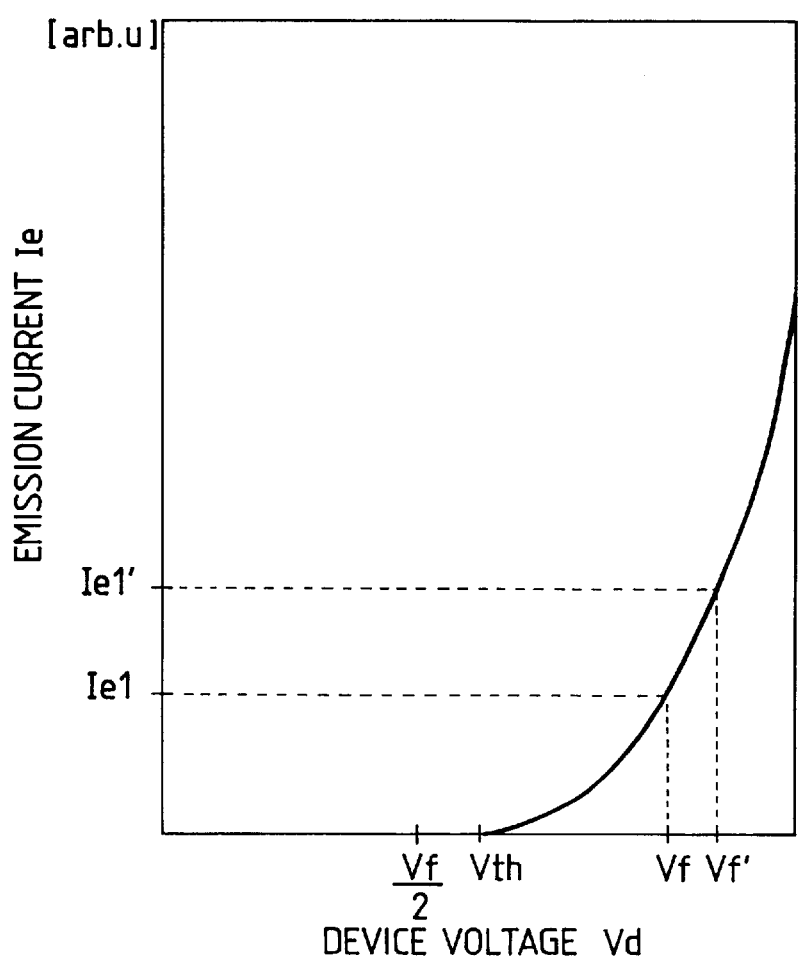
FIG. 15 is a graph showing typical characteristics of the surface conduction electron-emitting device used in the embodiment.

FIG. 15 shows a typical example of characteristics of (emission current Ie) versus (device voltage Vd) of the device used in the display device. Note that a characteristic curve in the graph is plotted in arbitrary units because the emission current Ie is variable depending upon changes in the design parameters such as the size and configuration of the device.

The electron-emitting device used in the display device has the following three characteristics with respect to the emission current Ie.

First, the emission current Ie is abruptly increased when the voltage applied to the electron-emitting device exceeds a certain value (called a threshold voltage Vth), but it is not appreciably detected below the threshold voltage Vth.

Thus, the electron-emitting device is a non-linear device having the definite threshold voltage Vth with respect to the emission current Ie.

Secondly, the emission current Ie varies depending upon the device voltage Vd and, therefore, its magnitude can be controlled by the device voltage Vd.

Thirdly, since the current Ie emitted from the electron-emitting device has a high response speed with respect to the device voltage Vd, the amount of electron charges emitted from the device can be controlled with the time during which the device voltage Vd is applied.

Because of having the above characteristics, the surface conduction electron-emitting device can be satisfactorily used in the display device. By utilizing the first characteristic in the display device which includes a number of surface conduction electron-emitting devices arranged corresponding to pixels on the display screen, for example, an image can be displayed by sequentially scanning the display screen. Specifically, an appropriate voltage not less than the threshold voltage Vth corresponding to the desired luminance of emitted light is applied to the devices to be driven or selected, whereas a voltage less than the threshold voltage Vth is applied to the devices to be not selected. Then, the devices to be driven are changed over sequentially so that the display screen is scanned sequentially to display an image.

Also, by utilizing the second or third characteristic, the luminance of emitted light can be controlled so as to provide gradation display.

Structure of Multi-Electron Beam Source Comprising Numerous Devices of Simple Matrix Wiring A description will now be made of the structure of a multi-electron beam source in which the above surface conduction electron-emitting devices are arrayed with the simple matrix wiring on a substrate.

Figure 16:
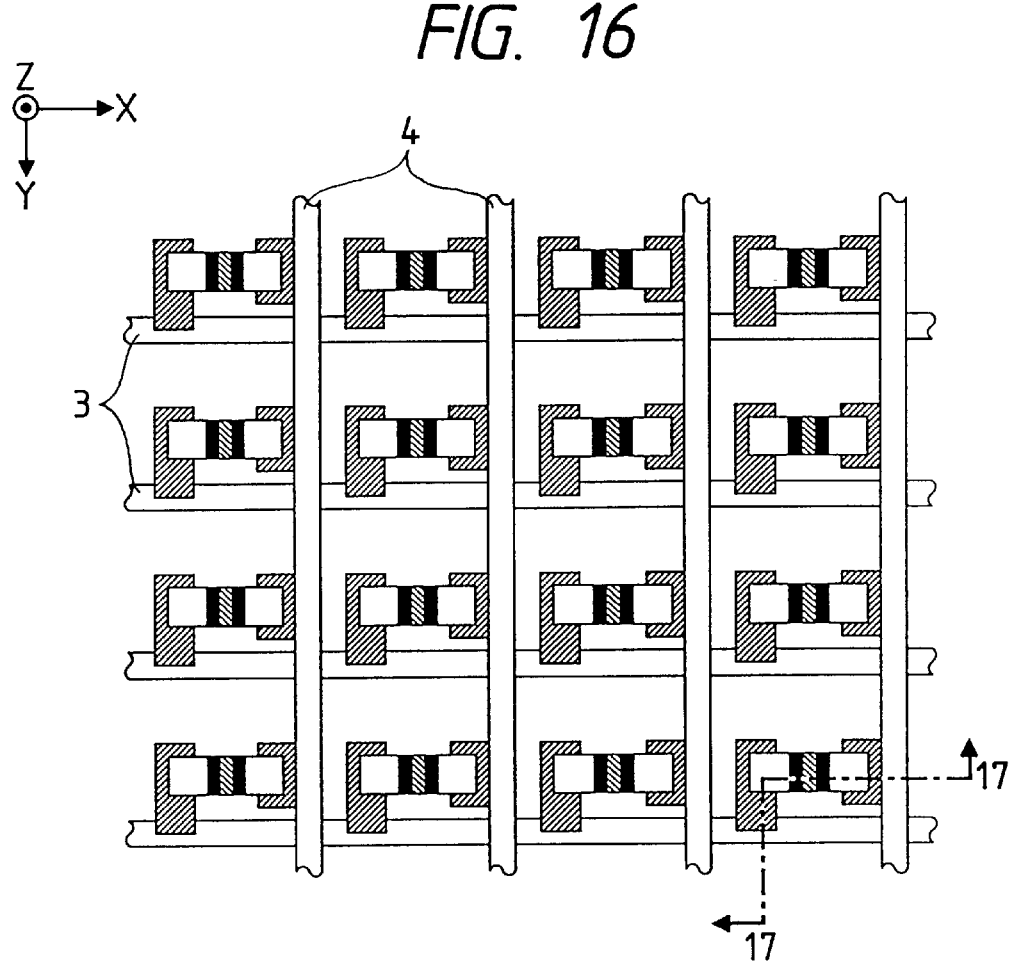
FIG. 16 is a plan view of a multi-electron beam source substrate used in the embodiment.

FIG. 16 is a plan view of the multi-electron beam source used in the above-described display panel of FIG. 2. On a substrate, there are formed surface conduction electron-emitting devices which are each the same as shown in FIGS. 9A and 9B, and which are arrayed with the simple matrix wiring using row-directional wirings 3 and column-directional wirings 4. At intersects between the row-directional wirings 3 and the column-directional wirings 4, insulating layers (not shown) are formed therebetween to keep both the wirings electrically insulated from each other.

Figure 17:
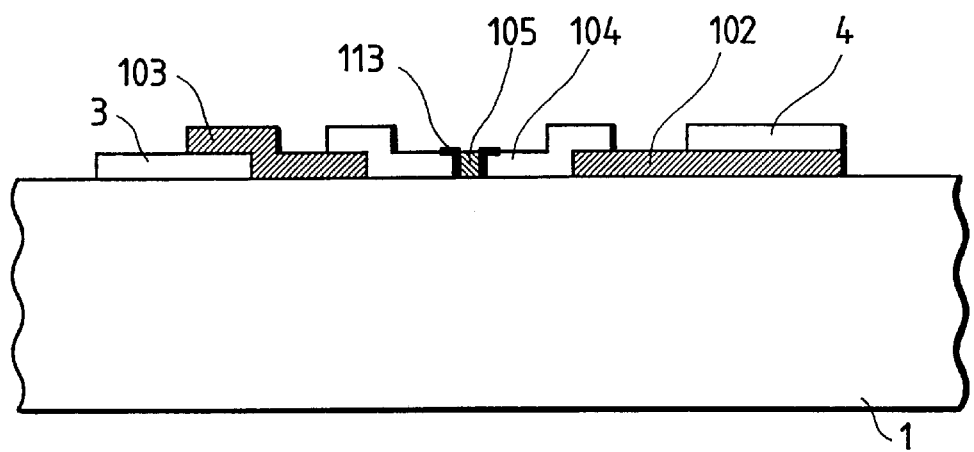
FIG. 17 is a partial sectional view of the multi-electron beam source substrate used in the embodiment.

FIG. 17 shows a section taken along line 17—17 in FIG. 16.

The multi-electron beam source of such a structure is manufactured by first forming the row-directional wirings 3, the column-directional wirings 4, the insulating layers (not shown) between both the wirings, and the electrodes and conductive thin films of the surface conduction electron-emitting devices on the substrate 1, and then energizing the devices through the row-directional wirings 3 and the column-directional wirings 4 to carry out the forming process and the activating process by energization.

(Configuration of Electric Circuitry)

The configuration of an electric circuitry used in the image display device of Embodiment 1 will be described with reference to FIG. 18.

Figure 18:
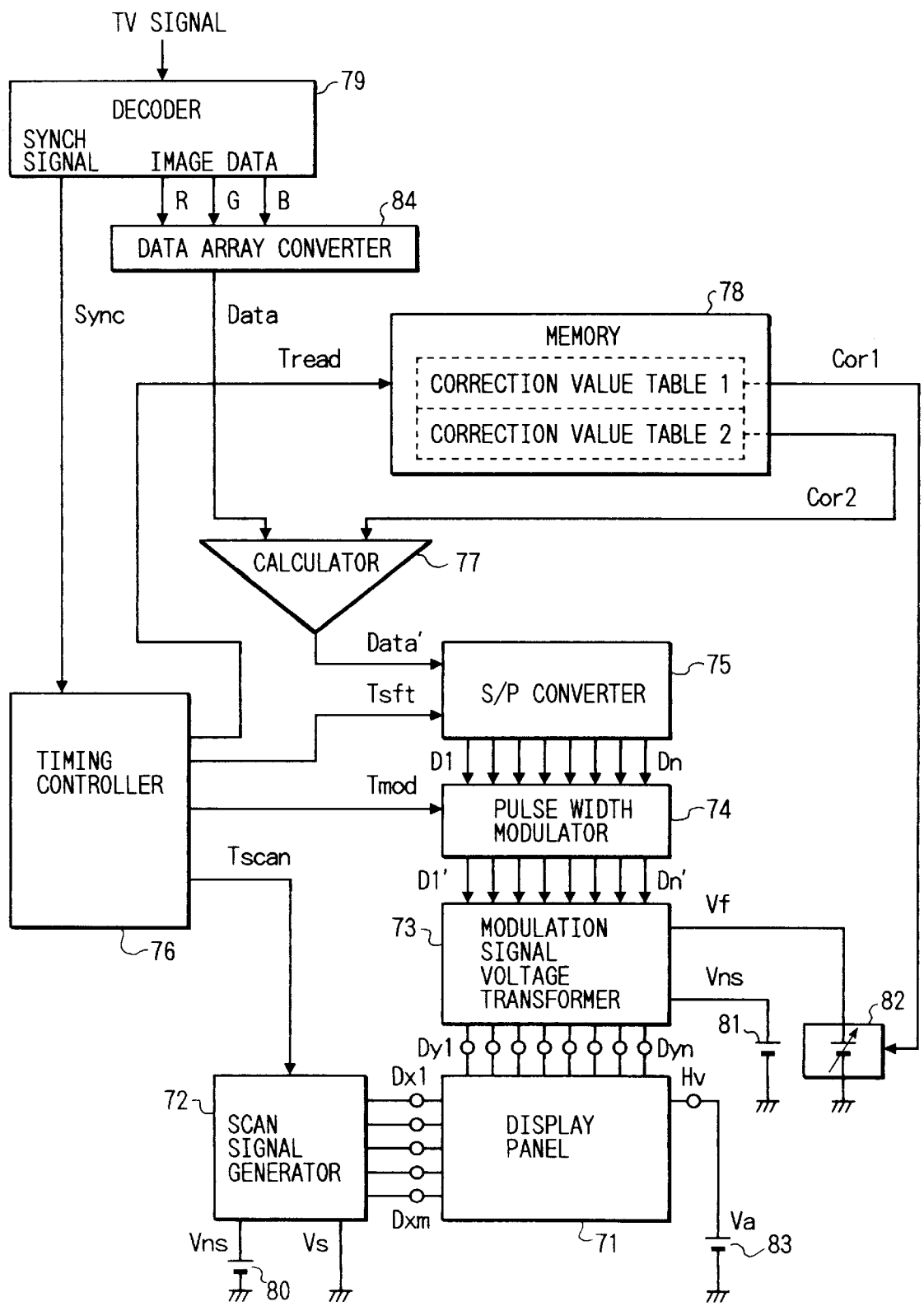
FIG. 18 is a block diagram of an electric circuitry of Embodiment 1.

FIG. 18 is a block diagram showing the basic configuration of the electric circuitry. In FIG. 18, denoted by 71 is a display panel, 72 is a scan signal generator, 73 is a modulation signal voltage transformer, 74 is a pulse width modulator, 75 is a serial/parallel (S/P) converter, 76 is a timing controller, 77 is a calculator, 78 is a memory, 79 is a decoder, 80 is a constant-voltage source, 81 is another constant-voltage source, 82 is a controlled voltage source, 83 is a still another constant-voltage source, and 84 is a data array converter.

Functions of those components will be described below one by one.

The structure of the display panel 71 has already been explained with reference to FIG. 2. The terminals Dxl to Dxm of the display panel 71 are electrically connected to the scan signal generator 72, the terminals Dyl to Dyn are to the modulation signal voltage transformer 73, and the terminal Hv is to the constant-voltage source 83, respectively.

The scan signal generator 72 is a circuit for generating scan signals to sequentially scan the multi-electron beam source, which is built in the display panel 71, in synch with the timing at which an image is displayed. More specifically, the scan signal generator 72 applies a select voltage Vs (V) to one of the terminals Dxl to Dxm of the display panel 71 and a non-select voltage Vns to the remaining (m−1) terminals. At this time, the terminals supplied with the select voltage Vs are scanned sequentially in accordance with a scan timing control signal Tscan generated by the timing controller 76. The select voltage Vs is set to 0 V and is practically supplied from the ground level. The non-select voltage Vns is set to a value resulted from multiplying 0.8 by the electron emission threshold voltage Vth of the electron-emitting device described above in connection with FIG. 15, and is supplied from the constant voltage source 80.

The modulation signal voltage transformer 73 is a voltage transformation circuit for transforming the voltage of a modulation signal output from the pulse width modulator 74 into the voltage suitable for driving the multi-electron beam source. More specifically, it transforms a high level of the modulation signal output form the pulse width modulator 74 into Vf (V), and a low level thereof into Vns (V). Vf (V) is set, as a reference value, to a value resulted from multiplying 1.6 by the electron device, but is corrected depending upon a positional deviation between the stripe of fluorescent substance and the electron-emitting device as required. Vf (V) is supplied to the modulation signal voltage transformer 73 from the controlled voltage source 82. Further, Vns (V) is set to a value resulted from multiplying 0.8 by the electron emission threshold voltage Vth of the electron-emitting device, and is supplied from the constant-voltage source 81.

The constant-voltage source 83 applies a voltage Va V to the fluorescent film of the display panel 71 through the terminal Hv.

In determining the output voltages of the respective power sources, the following requirements musbe taken into account.

Electric power (Ie×Va) required to achieve the d esired luminance can be supplied to the fluorescent substances.

Driving conditions as the parameters to be put into above Equation [3] are set so that an electron beam irradiates a predetermined position of the corresponding stripe of fluorescent substance.

Vs and Vns are set so as not to cause a cross-talk between the electron-emitting devices arrayed with the simple matrix wiring.

In the image display device of this Embodiment 1, therefore, Vns=7.2 V and Vf (reference value)=14.2 V are set in consideration of characteristics of the surface conduction electron-emitting device used in the multi-electron beam source and light-emitting characteristics of the fluorescent substances, and Va=5 kV is set in conformity with light-emitting characteristics of the fluorescent film.

The decoder 79 is a circuit for decoding an image signal input from the exterior, and comprises a decoder for TV signals of NTSC standards in this Embodiment 1. The decoder 79 outputs a synch signal Sync and an image data R, G, B. The synch signal Sync includes a vertical synch signal and a lateral synch signal, and the image data R, G, B include luminance data for red, green and blue colors.

The data array converter 84 is a circuit for rearranging the luminance data in three primary colors supplied from the decoder 79 into data in match with the pixel array of the display panel 71. Specifically, it samples and rearranges the image data R, G. B in match with the stripes of fluorescent substances in three primary colors, and then outputs them as a serial signal Data.

The timing controller 76 generates, based on the synch signal Sync supplied from the decoder 79, timing control signals (Tread, Tsft, Tmod, Tscan and other not-shown signals) for adjusting the timing in operation of the corresponding components.

The memory 78 stores a correction value table 1 and a correction value table 2, and reads the stored data in response to the read timing control signal Tread supplied from the timing controller 76. The data stored as the correction value table 1 and the correction value table 2 are correction coefficients determined depending upon positional deviations between the electron-emitting device and the stripe of fluorescent substance in the display panel 71 after completion of its assembly.

More specifically, the data of the correction value table 1 is at least one parameter for correcting the paths of electron beams so that the electron beams irradiate predetermined positions on the corresponding stripes of fluorescent substances; in practice, the data is at least one correction coefficient of the voltage Vf applied to the electron-emitting devices. A correction coefficient Cor1 read out of the correction value table 1 is supplied to the controlled voltage source 82 to correct the output voltage Vf thereof.

The data of the correction value table 2 is at least one parameter for compensating a change in the luminance of emitted-light caused when the voltage Vf applied to the electron-emitting devices is corrected in accordance with the correction value table 1; in practice, the data at least one correction coefficient for the image data Data. A correction coefficient Cor2 read out of the correction value table 2 is supplied to the calculator 77 to correct the image data Data.

The calculator 77 performs calculation for correcting the image data Data supplied from the data array converter 84 in accordance with the correction coefficient Cor2 read out of the correction value table 2 in the memory 78.

The serial/parallel converter 75 is a circuit for carrying out serial/parallel conversion of corrected image data Data' output from the calculator 77 per line (i.e., in units of n pixels) of an image, and comprises a shift register with a latch. The serial/parallel converter 75 outputs a number n of parallel signals D1 to Dn. The timing control signal Tsft supplied from the timing controller 76 includes a shift clock for operating the shift register and a latch clock for transferring data of one line to the latch at the time the data is fully accumulated in the shift register.

The pulse width modulator 74 includes a number n of pulse width modulating circuits which output pulse width modulating signals D1' to Dn', respectively, based on D1 to Dn supplied from the serial/parallel converter 75. Specifically, the modulator 74 outputs, in accordance with the corrected image data, a pulse having a longer (shorter) width for the data requiring a larger (smaller) luminance. The timing at which the pulse width modulating signals D1' to Dn' are each output is controlled by the control signal Tmod supplied from the timing controller 76, to thereby adjust synchronous relation between the scan signal output from the scan signal generator 72 and the pulse width modulating signals.

(Procedures of Correction)

A description will now be made of procedures for preventing deterioration of image quality due to a positional deviation between the electron-emitting device and the stripe of fluorescent substance in the image display device of Embodiment 1.

Prior to starting operation of the image display device, correction values must be stored in the memory 78 of FIG. 18. Procedures for this step will first be described with reference to a flowchart of FIG. 19.

S81

At the outset, the display panel is assembled. Specifically, the substrate having the electron-emitting devices formed thereon and the face plate having the stripes of fluorescent substances formed thereon are positioned to each other, and the vacuum container is sealed off, thereby assembling the display panel shown in FIG. 2.

S82

Then, the assembled display panel is checked to measure a deviation of the relative distance between the electron-emitting device and the stripe of fluorescent substance from a set value. The deviation is practically measured by observing both the alignment mark put on the substrate having the electron-emitting devices and the alignment mark put on the face plate by a stereoscopic microscope. Depending upon the cases, the deviation may be evaluated by driving the electron-emitting device by way of trial, causing the fluorescent substance to actually radiate light, and comparing the position where the light is actually radiated with the position where the light is to be radiated by design.

S83

Then, in accordance with the deviation of the relative distance between the electron-emitting device and the stripe of fluorescent substance from the set value measured in S82, correction values of the driving parameters are calculated by using a computer. The correction values of the driving parameters will be described later with reference to FIGS. 20 to 23.

S84

Finally, the correction values calculated in S83 are stored in the memory 78 of FIG. 18.

The procedures for storing the correction values in the memory 78 have been described above. The correction values stored in the memory 78 will now be described with reference to FIGS. 1A, 1B and 20 to 23.

As mentioned before, the electron-emitting devices and the stripes of fluorescent substance are rarely assembled as per the design values with no positional deviations, but nearly all of panels actually assembled accompany with positional deviations of which directions and amounts are different from panel to panel. Therefore, the positional deviations are classified into several types, and the corrections values will be described for each of the types.

With No Positional Deviation

FIG. 20 is a plan view schematically showing positions irradiated by electron beams, the view showing the case where the substrate having the electron-emitting devices formed thereon as shown in FIG. 1A and the face plate having the stripes of fluorescent substances formed thereon as shown in FIG. 1B are assembled as per the design values with no positional deviations.

In FIG. 20, XY-coordinates represent the directions in which the electron-emitting devices are two-dimensionally arranged, and AP, AE indicate the alignment marks. When the panel is assembled as per design with no positional deviations, the electron beams irradiate the predetermined positions in the stripes of fluorescent substances as shown. The problems of inexact coloration and a reduction in luminance are not naturally produced. Therefore, the output voltage of the control voltage source 82 in FIG. 18 can be remained the same as the reference value set in the design process, i.e., Vf=14.2 V. Accordingly, the data of the correction value table 1 in the memory 78 is set so as to provide the control signal suitable for causing the control voltage source 82 to output 14.2 V. Also, the image data Data can be directly output as it is through the calculator 77. Therefore, when the calculator 77 comprises a calculator for multiplication and division, the data of the correction value table 2 is set to 1.

Stripes of Fluorescent Substances Assembled with Y-Directional Deviation

Figure 21:
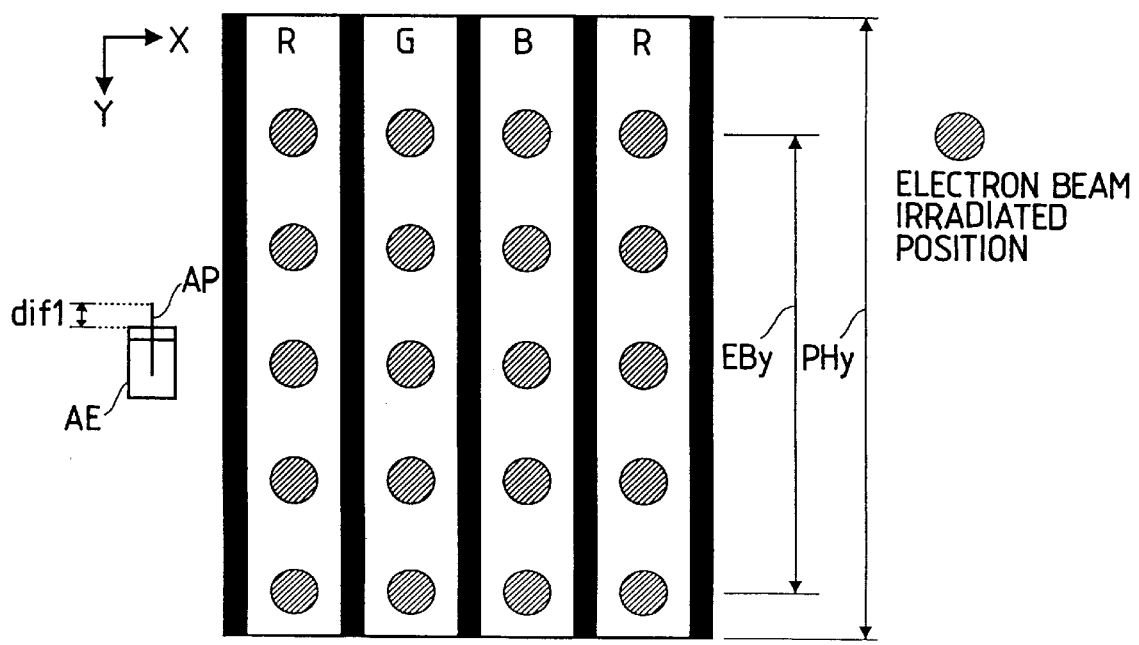
FIG. 21 is a plan view showing positions of electron beams irradiated when the stripes of fluorescent substances are deviated in the Y-direction with respect to the electron-emitting devices in assembly.

FIG. 21 is a schematic plan view showing the case where the stripes of fluorescent substances are deviated a distance dif1 in the Y-direction of the array of electron-emitting devices. The positions irradiated by the electron beams are deviated from the set positions in the Y-direction. As explained before in connection with Equation [2], however, since the length PHy of the stripes of fluorescent substances is set to be larger than the Y-directional length EBy of the region where the electron-emitting devices are arrayed on the substrate, the problems of edge lacking of the displayed image are not produced. Therefore, the output voltage of the control voltage source 82 in FIG. 18 can remain the same as the reference value set in the design process, i.e., Vf=14.2 V. Accordingly, the data of the correction value table 1 in the memory 78 is set so as to provide the control signal suitable for causing the control voltage source 82 to output 14.2 V. Also the image data Data can be directly output as it is through the calculator 77. Therefore, when the calculator 77 comprises a calculator for multiplication and division, the data of the correction value 2 is set to 1.

Stripes of Fluorescent Substances Assembled with X-Directional Deviation

Figure 22:
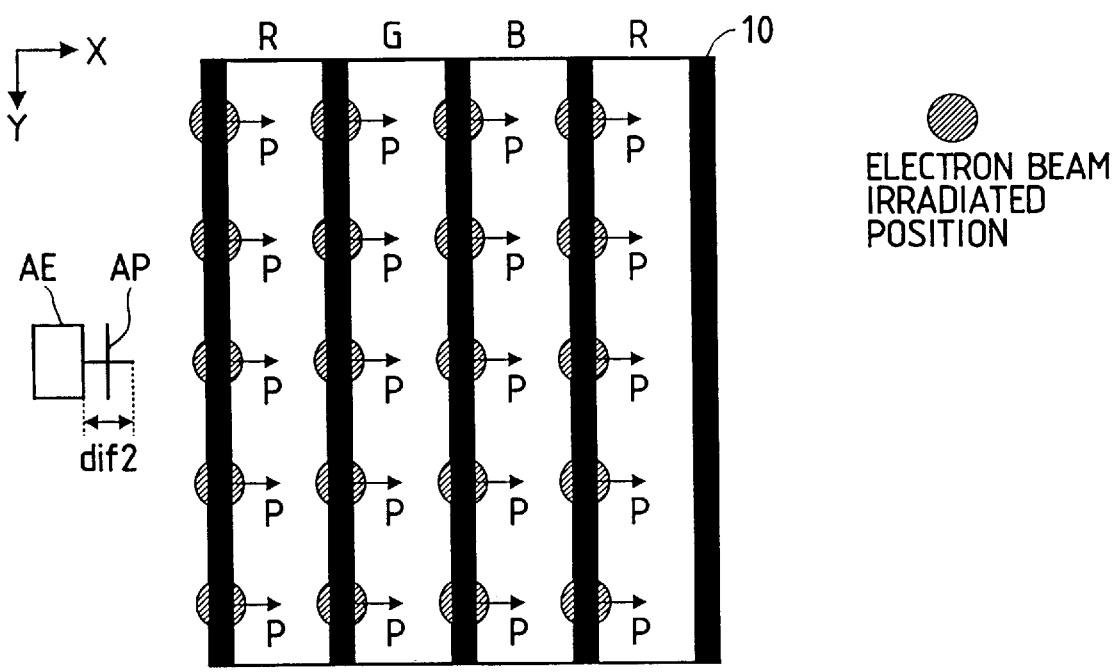
FIG. 22 is a plan view showing positions irradiated by electron beams when the stripes of fluorescent substances are deviated in the X-direction with respect to the electron-emitting devices in assembly.

FIG. 22 is a schematic plan view showing the case where the stripes of fluorescent substances are deviated a distance dif2 in the X-direction of the array of electron-emitting devices. Because the electron beams irradiate the black conductors 10 and the adjacent stripes of fluorescent substances as shown, there would occur a deficiency of luminance and inexact coloration. In this Embodiment, however, such a deficiency of luminance and inexact coloration can be prevented by correcting the drive voltage of the electron-emitting devices to thereby correct the positions irradiated by the electron beams in the direction of each arrow p in FIG. 22.

More specifically, the distance by which the electron beams deflect is corrected in the amount of dif2 by utilizing the relationship of Equation [3]. Thus, dif2 is expressed below;

$$dif2 = \frac{2 \times K \times Lh \times (\sqrt{Vf'} - \sqrt{Vf})}{\sqrt{Va}} \qquad [4]$$

where dif2 m is the distance by which each stripe of fluorescent substance is deviated from the set position in the X-direction, Lh m is the distance between the electron-emitting device and the corresponding stripe of fluorescent substance, Vf V is the reference value of the drive voltage applied to the electron-emitting device, Vf' V is the corrected drive voltage applied to the electron-emitting device, Va V is the voltage applied to the fluorescent substances, and K is the constant determined depending upon the type and configuration of the electron-emitting device.

Solving Equation [4] for Vf', $$Vf' = \left(\sqrt{Vf} + \frac{\sqrt{Va} \times dif2}{2 \times K \times Lh}\right)^2 \qquad [4']$$

is obtained. Therefore, the correction value stored as data of the correction value table 1 in the memory 78 is set so as to correct the output voltage of the control voltage source 82 from Vf to Vf' calculated by Equation [4'].

On the other hand, when the drive voltage of the electron-emitting devices is corrected from Vf to Vf', the positions irradiated by the electron beams are corrected, but the luminance of an entire displayed image is simultaneously varied because of an increase in the emission current Ie. Referring to the electron emission characteristic shown in FIG. 15, the emission current is increased from Ie to Ie1'. Therefore, the luminance of the entire displayed image becomes as bright as Ie'/Ie times the initial design luminance. Such a change in luminance is prevented by correcting the image data Data. In this Embodiment, a multiplier is used as the calculator 77 and Ie/Ie' is stored as a correction value for the correction value table 2 in the memory 78.

By storing the above two correction values respectively in the correction value Tabels 1 and 2 in the memory 78, both the positions and electric charges irradiated by the electron beams can be corrected when the stripes of fluorescent substances are deviated in the X-direction. It is a matter of course that while FIG. 22 illustrates the case where the stripes of fluorescent substances are deviated only in the X-direction, the possible drawbacks can also be solved by storing the similar corrections values in the memory 78 even when the Y-directional deviation as shown in FIG. 21, for example, is caused at the same time.

Stripes of Fluorescent substances (Face Plate) Assembled with Angular Deviation

Figure 23:
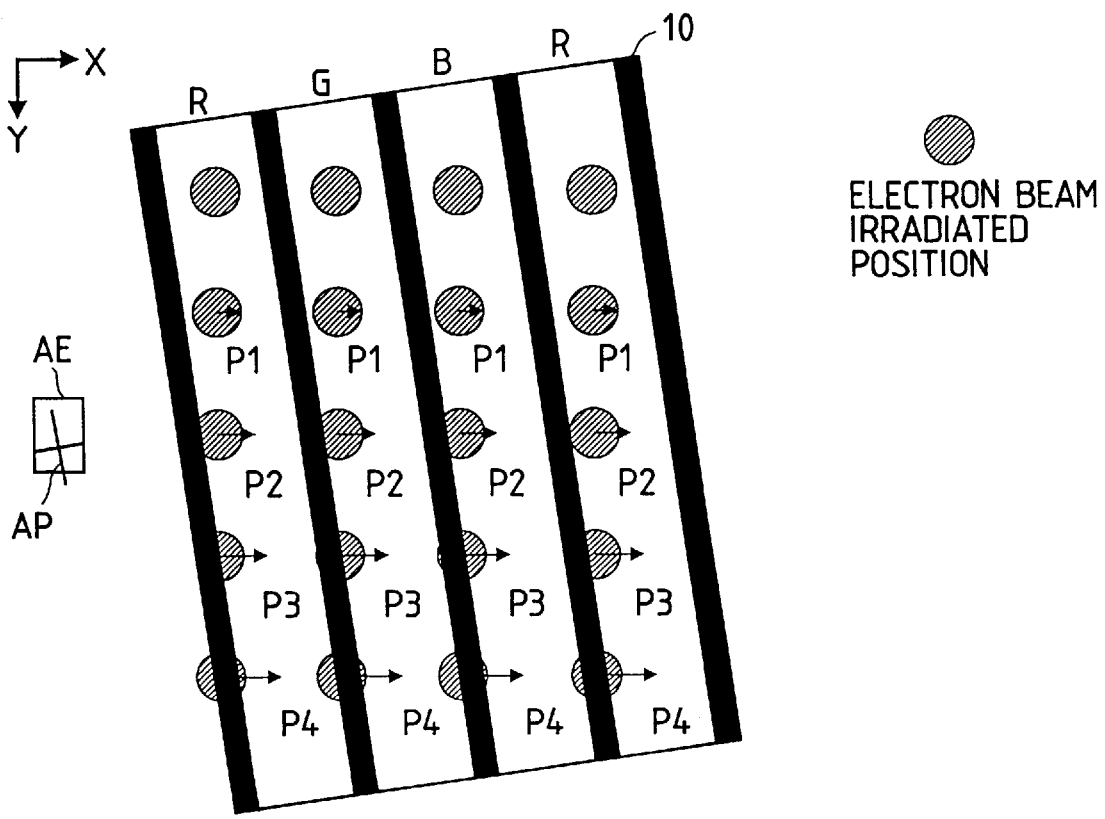
FIG. 23 is a plan view showing positions irradiated by electron beams when the stripes of fluorescent substances are deviated obliquely at some angle with respect to the electron-emitting devices in assembly.

FIG. 23 is a schematic plan view showing the case where the face plate is rotated and hence assembled with some angular deviation from a predetermined angle with respect to the substrate having the electron-emitting devices formed thereon.

In this case, because the electron beams irradiate the black conductors 10 and the adjacent stripes of fluorescent substance as shown, there would occur a deficiency of luminance and inexact coloration. Further, since the positions irradiated by the electron beams are deviated in different amounts depending upon locations on the display screen, image quality would be deteriorated unevenly over the entire display screen.

In this Embodiment, however, such a deficiency of luminance and inexact coloration can be prevented by correcting the drive voltage of the electron-emitting devices to thereby correct the positions irradiated by the electron beams in the direction and amounts indicated by arrows p1 to p4 in FIG. 23. Thus, the distances by which the electron beams deflect are corrected by utilizing the relationship of Equation [3] as with the above case of FIG. 22.

At this time, rather than carrying out the same amount of correction for all the electron-emitting devices as with the above case of FIG. 22, the correction is performed for each X-directional line of the electron-emitting devices.

More specifically, correction values of the drive voltage for corresponding lines of the electron-emitting devices are stored as data of the correction value table 1 in the memory 78 and are read out in synch with the timing at which the electron-emitting devices are driven on a line-by-line basis, thereby correcting the output voltage of the control voltage source 82.

Further, to prevent the luminance from changing upon correction of the positions irradiated by the electron beams, the image data Data is also required to be corrected in different amounts for each line of the electron-emitting devices. Therefore, correction values of the luminance for corresponding lines of the electron-emitting devices are stored as data of the correction value table 2 in the memory 78 and are each read out in synch with the timing at which the image data Data is input, followed by correction of the image data in the calculator 77.

By calculating the two correction values for each device line and storing them respectively in the correction value tables 1 and 2 in the memory 78 as explained above, both the positions and electric charges irradiated by the electron beams can be corrected when the stripes of fluorescent substances are deviated obliquely at some angle.

While the correction is performed in units of line of the electron-emitting devices in the foregoing, it is desired to make correction for each of the electron-emitting devices when the positional deviation should be corrected more precisely. In this case, correction values of the drive voltage for the corresponding electron-emitting devices are stored as data of the correction value table 1 in the memory 78 and the control voltage source 82 in FIG. 18 is prepared in number n, thereby individually correcting voltages of the output signals Dl' to Dn' from the pulse width modulator 74. Further, correction values of the luminance for the corresponding electron-emitting devices are stored as data of the correction value table 2 in the memory 78, and the image signal is subjected to the correction calculation for each pixel in the calculator 77.

The image display device of Embodiment 1 has been described above. As will be apparent from the description, a good display image can be provided regardless of whether the electron-emitting devices and the stripes of fluorescent substances are deviated or not from their proper positional relationship.

[Embodiment 2]

Next, another preferred embodiment of the image display device of the present invention will be described below. The structure and manufacture process of a display panel and the preferable structure and manufacture process of electron-emitting devices are similar as in above Embodiment 1 and hence are not described here. The configuration of an electric circuitry and the procedures of correction are described below.

(Configuration of Electric Circuitry)

The configuration of an electric circuitry used in the image display device of Ebodiment 2 will be described with reference to FIG. 24.

Figure 24:
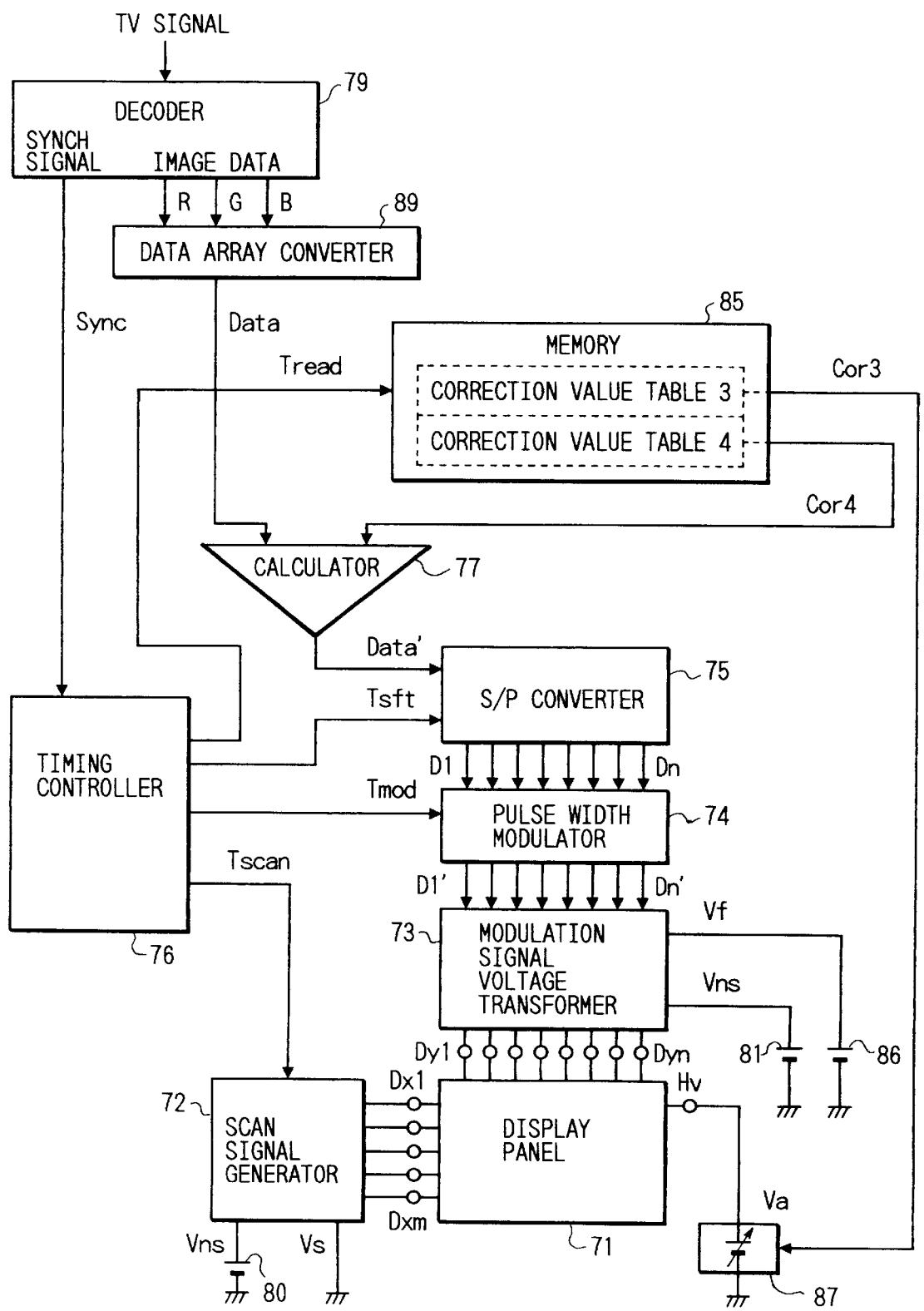
FIG. 24 is a block diagram of an electric circuitry of Embodiment 2.

FIG. 24 is a block diagram showing the basic configuration of the electric circuitry. In FIG. 24, denoted by 71 is a display panel, 72 is a scan signal generator, 73 is a modulation signal voltage transformer, 74 is a pulse width modulator, 75 is a serial/parallel (S/P) converter, 76 is a timing controller, 77 is a calculator, 79 is a decoder, 80 is a constant-voltage source, 81 is another constant-voltage source, and 84 is a data array converter. These circuits have the same functions as those of the corresponding circuits in Embodiment 1 described above with reference to FIG. 18. Further, 85 is a memory, 86 is still another constant-voltage source, and 87 is a controlled voltage source.

Embodiment 2 is different from Embodiment 1 in that while the positions irradiated by the electron beams are corrected in above Embodiment 1 by correcting the drive voltage Vf applied to the electron-emitting devices, the positions irradiated by the electron beams are corrected in this Embodiment 2 by correcting the voltage Va applied to the fluorescent substances. Therefore, the electric circuitry of FIG. 24 is arranged to be able to correct the voltage Va applied to the fluorescent substances depending upon the deviation of the electron-emitting device and the stripe of fluorescent substance.

More specifically, a correction value of the voltage Va applied to the fluorescent substances is stored as data of the correction table 3 in the memory 85, and the controlled voltage source 87 connected to a terminal 11v of the display panel 71 outputs a voltage in accordance with a correction value Cor3 read out of the correction value table 3. The output voltage of the controlled voltage source 87 is set to 5 kV as a reference value and corrected in accordance with the correction value Cor3.

Also, the output voltages of the constant-voltage sources 80, 81 are each set to Vns=7.2 V, while the output voltage of the constant-voltage source 86 is set to Vf=14.2 V.

(Procedures of Correction)

Figure 19:
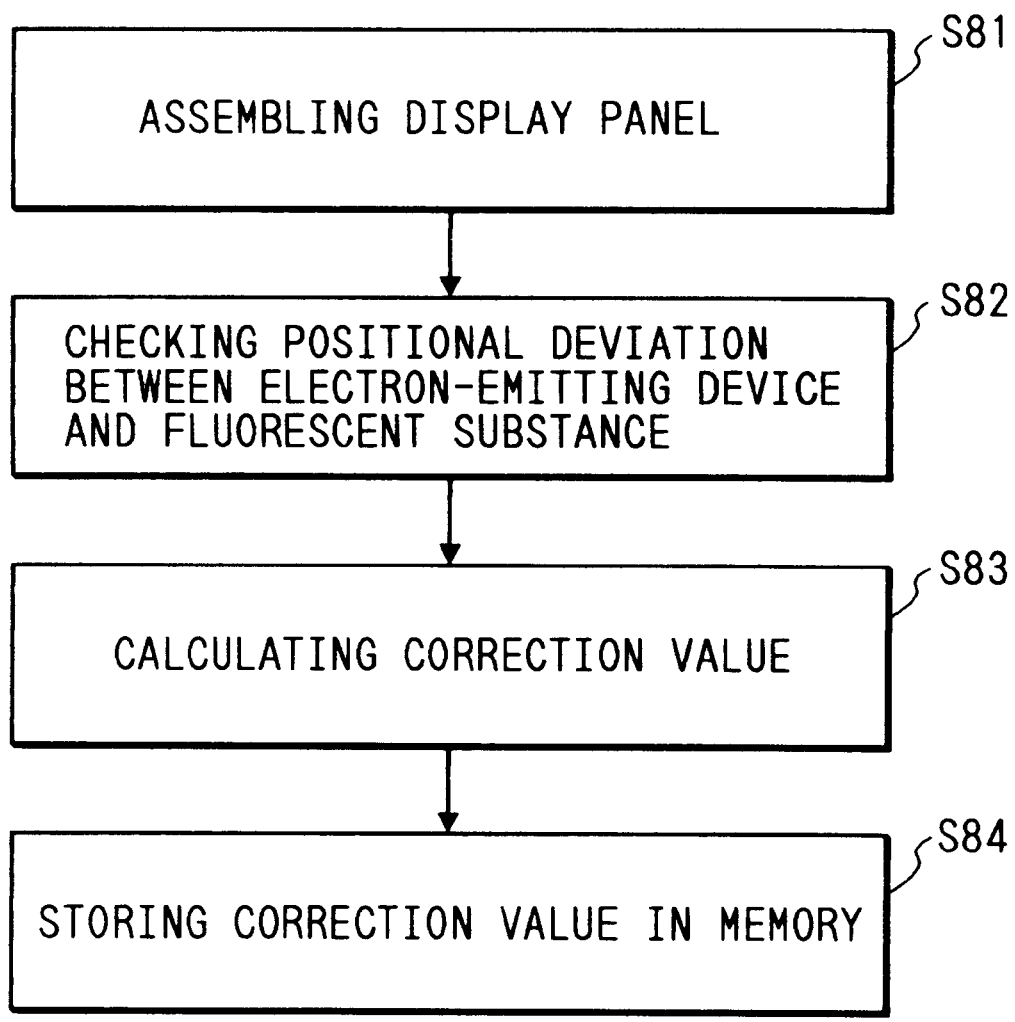
FIG. 19 is a flowchart showing steps for storing a correction value in a memory.

In the image display device of Embodiment 2, the correction values are stored as data of the correction value tables 3 and 4 in the memory 85 beforehand following the procedures shown in the flowchart of FIG. 19.

Details of the correction values will be described below.

With No Positional Deviation

When there occur no positional deviations as shown in FIG. 20, the output voltage of the controlled voltage source 87 can be remained the same as the reference value, i.e., Va=5 kV. Accordingly, the data of the correction value table 3 in the memory 85 is set so as to provide the control signal Cor3 suitable for causing the controlled voltage source 87 to output 5 kV. Also, the image data Data can be directly output as it is through the calculator 77. Therefore, when the calculator 77 comprises a calculator for multiplication and division, the data of the correction value table 4 is set to 1.

Stripes of Fluorescent Substances Assembled with Y-Directional Deviation

When the stripes of fluorescent substances are deviated in the Y-direction as shown in FIG. 21, the positions irradiated by the electron beams are deviated from the set positions in the Y-direction. As explained before in connection with Equation [2], however, since the length PHy of the stripes of fluorescent substances is set to be larger than the Y-directional length EBy of the region where the electron-emitting devices are arrayed on the substrate, the problems of edge lacking of the displayed image are not produced. Therefore, the output voltage of the controlled voltage source 87 in FIG. 24 can remain the same as the reference value set in the design process, i.e., Va=5 kV. Accordingly, the data of the correction value table 3 in the memory 85 is set so as to provide the control signal Cor3 suitable for causing the controlled voltage source 87 to output 5 kV. Also, the image data Data can be directly output as it is through the calculator 77. Therefore, when the calculator 77 comprises a calculator for multiplication and division, the data of the correction value table 4 is set to 1.

Stripes of Fluorescent Substances Assembled with X-Directional Deviation

When the stripes of fluorescent substances are deviated a distance dif2 in the X-direction of the array of electron-emitting devices as shown in FIG. 22, a deficiency of luminance and inexact coloration are prevented in this Embodiment 2 by correcting the voltage applied to the fluorescent substances to thereby correct the positions irradiated by the electron beams in the direction of each arrow p in FIG. 22.

More specifically, the distance by which the electron beams deflect is corrected in the amount of dif2 by utilizing Equation [3]. Thus, dif2 is expressed below;

$$dif2 = 2 \times K \times Lh \times \sqrt{Vf} \times \left( \frac{1}{\sqrt{Va'}} - \frac{1}{\sqrt{Va}} \right) \quad [5]$$

where dif2 m is the distance by which each stripe of fluorescent substance is deviated from the set position in the X-direction, Lh m is the distance between the electron-emitting device and the corresponding stripe of fluorescent substance, Vf V is the drive voltage of the electron-emitting device, Va V is the voltage applied to the fluorescent substances (reference value), Va' V is the corrected voltage applied to the fluorescent substances, and K is the constant determined depending upon the type and configuration of the electron-emitting device.

Solving Equation [5] for Va', $$Va' = \frac{1}{\left(\frac{dif2}{2 \times K \times Lh \times \sqrt{Vf}} + \frac{1}{\sqrt{Va}}\right)^2} \quad [5']$$

is obtained. Therefore, the correction value stored as data of the correction value table 3 in the memory 85 is set so as to correct the output voltage of the controlled voltage source 87 from Va to Va' calculated by Equation [5'].

On the other hand, when the voltage applied to'the fluorescent substances is corrected from Va to Va', the positions irradiated by the electron beams are corrected, but the luminance of an entire displayed image is simultaneously varied because of a change in electric power used to excite the fluorescent substances from Ie×Va to Ie×Va'. Thus, the luminance of the entire displayed image becomes as bright or dark as Va'/Va times the initial design luminance. Such a change in luminance is prevented by correcting the image data Data. In this Embodiment, a multiplier is used as the calculator 77 and Va/Va' is stored as a correction value for the correction value table 4 in the memory 85.

By storing the above two correction values respectively in the correction values 3 and 4 in the memory 85, the positions irradiated by the electron beams and the electric power for exciting the fluorescent substances can be both corrected when the stripes of fluorescent substances are deviated in the X-direction. It is a matter of course that while FIG. 22 illustrates the case where the stripes of fluorescent substances are deviated only in the X-direction, the possible drawbacks can also be solved by storing the similar corrections values in the memory 85 even when the Y-directional deviation as shown in FIG. 21, for example, is caused at the same time.

Stripes of Fluorescent Substances (Face Plate) Assembled with Angular Deviation

When the face plate is rotated and hence assembled with some angular deviation from a predetermined angle with respect to the substrate having the electron-emitting devices formed thereon as shown in FIG. 23, a deficiency of luminance and inexact coloration are prevented in this Embodiment 2 by correcting the voltage Va applied to the fluorescent substances to thereby correct the positions irradiated by the electron beams in the direction and amounts indicated by arrows p1 to p4 in FIG. 23. Thus, the distances by which the electron beams deflect are corrected by utilizing the relationship of Equation [3] as with the above case described referring to FIG. 22.

At this time, rather than carrying out the same amount of correction for all the electron-emitting devices as with the above case referring to FIG. 22, the correction is performed for each X-directional line of the electron-emitting devices.

More specifically, correction values of Va for corresponding lines of the electron-emitting devices are stored as data of the correction value table 3 in the memory 85 and are read out in synch with the timing at which the electron-emitting devices are driven on a line-by-line basis, thereby correcting the output voltage of the controlled voltage source 87.

Further, to prevent the luminance from changing upon correction of the positions irradiated by the electron beams, the image data Data is also required to be corrected in different amounts for each line of the electron-emitting devices. Therefore, correction values of the luminance for corresponding lines of the electron-emitting devices are stored as data of the correction value table 4 in the memory 85 and are each read out in synch with the timing at which the image data Data is input, followed by correction of the image data in the calculator 77.

By calculating the two correction values for each device line and storing them respectively in the correction value tables 3 and 4 in the memory 85 as explained above, the positions irradiated by the electron beams and the electric power for exciting the fluorescent substances can be both corrected when the stripes of fluorescent substances are deviated obliquely at some angle.

The image display device of Embodiment 2 has been described above. As will be apparent from the description, a good display image can be provided regardless of whether the electron-emitting devices and the stripes of fluorescent substances are deviated or not from their proper positional relationship.

[Embodiment 3]

Still another preferred embodiment of the image display device of the present invention will be described below.

Figure 25A:
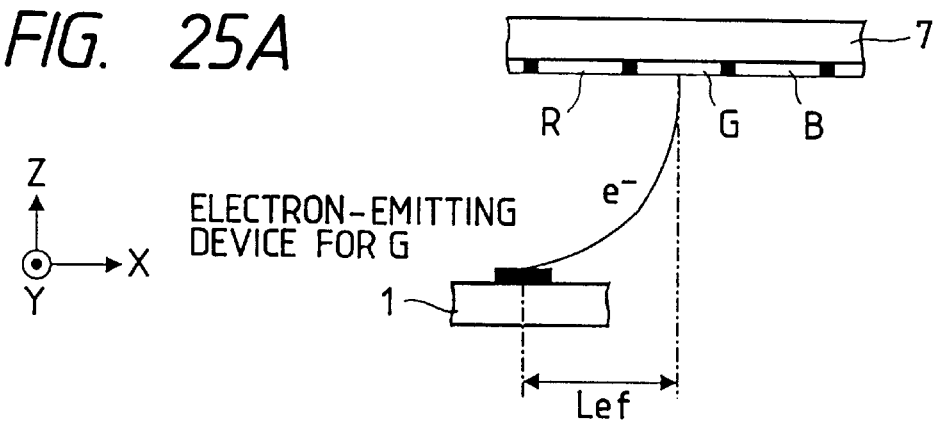
FIGS. 25A to 25C are sectional views for explaining a correction method of Embodiment 3.
Figure 25B:
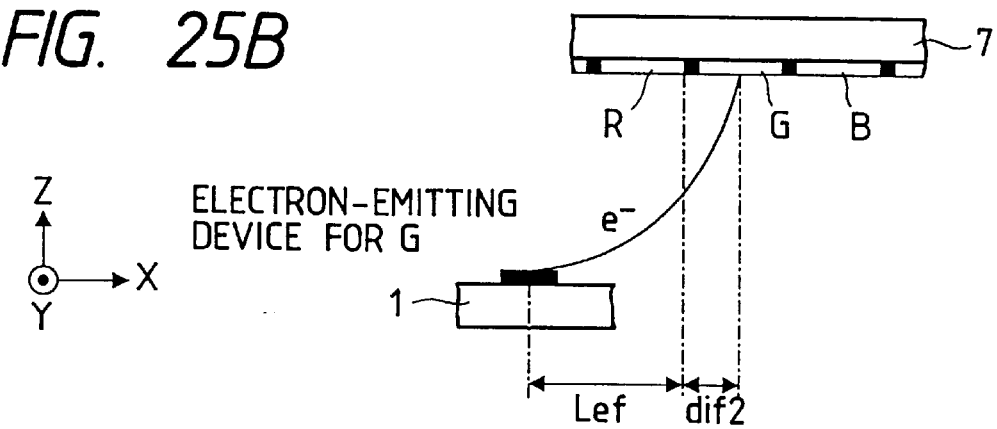
Figure 25C:
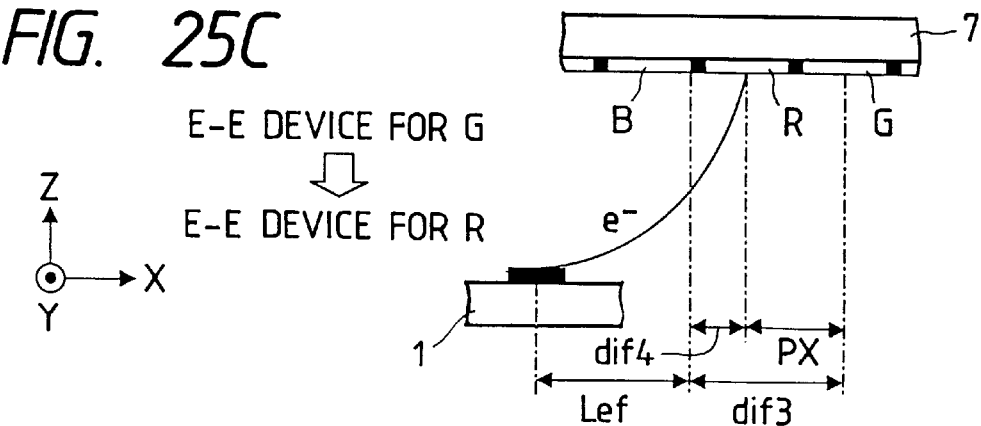

First, a correction method of this Embodiment 3 will be described with reference to FIGS. 25A to 25C. FIGS. 25A to 25C are sectional views each showing the path along which an electron beam emitted from one electron-emitting device flies to a corresponding stripe of fluorescent substance. In these drawings, denoted by 1 is a substrate on which electron-emitting devices are formed and 7 is a face plate. For convenience of description, only one electron-emitting device is shown in each drawing.

FIG. 25A illustrates the case where the electron-emitting device and the stripe of fluorescent substance are not deviated at all from the design positions after assembly of a display panel. In FIG. 25A, Lef represents the distance designed beforehand using above Equation [3].

In this case, as with above Embodiments 1 and 2, values of the voltage Vf applied to the electron-emitting device and the voltage Va applied to the fluorescent substance are not also corrected in Embodiment 3.

FIG. 25B illustrates the case where the stripe of fluorescent substance is deviated a distance dif2 in the X-direction from the design position shown in FIG. 25A after assembly of the display panel. It is here assumed that dif2 is smaller than the stripe pitch of the fluorescent substances.

In this case, as with above Embodiment 1, the voltage Vf applied to the electron-emitting device is also corrected in Embodiment 3 so that the electron beam from the G (green) electron-emitting device precisely irradiates the G fluorescent substance.

Alternatively, as with above Embodiment 2, the voltage Va applied to the fluorescent substance is also corrected.

FIG. 25C illustrates the case where the stripe of fluorescent substance is deviated a distance dif3 parallel in the X-direction or obliquely at some angle after assembly of the display panel. It is here assumed that dif3 is larger than the stripe pitch PX of the fluorescent substances.

In this case, the path of the electron beam could be corrected in an amount corresponding to the distance dif3 in theory by correcting Vf or Va as with the case of FIG. 25B. However, if a correction rate of Vf or Va is too large, the spot shape of the electron beam irradiated to the fluorescent substance may be deformed, or a change in luminance due to the voltage correction may not be sufficiently compensated for by correction of the image data. This would result in a deformation of the shape of a bright spot, a shift of luminance over an entire image, or a deficiency of the dynamic range for gradation.

To avoid such a drawback, in the image display device of this Embodiment 3, the path of the electron beam is corrected within a distance corresponding to one stripe pitch of the fluorescent substances by the voltage correction, and the drive signal applied to the electron-emitting device is replaced by the drive signal for the fluorescent substance which is to be actually irradiated by the electron beam from that electron-emitting device. Practically, in the case of FIG. 25C, the distance by which the path of the electron beam is corrected by the voltage correction is set to dif4 and the R (red) drive signal is applied to the electron-emitting device which has been designed as the G one.

The preferable construction of a display panel and an electric circuitry for carrying out such a correction method will be described below.

The display panel of Embodiment 3 is basically of the same construction as shown in FIG. 2. A face plate for use in the display panel of Embodiment 3 may be the same panel as shown in FIG. 1B, but a preferable one shown in FIG. 26B is used here.

Figure 26A:
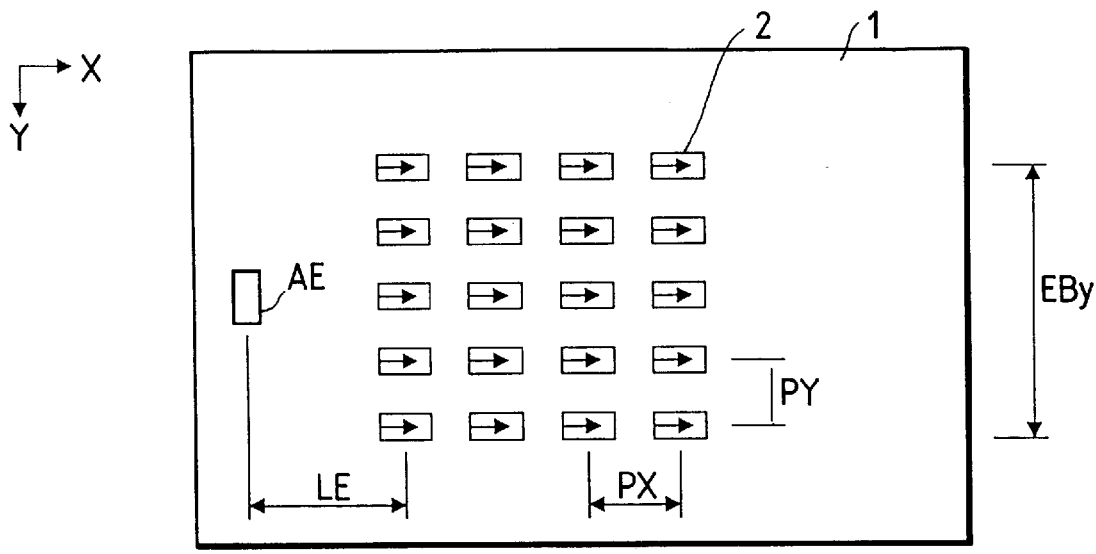
FIGS. 26A and 26B are schematic plan views showing set positions of electron-emitting devices and stripes of fluorescent substances in a display panel of Embodiment 3.
Figure 26B:
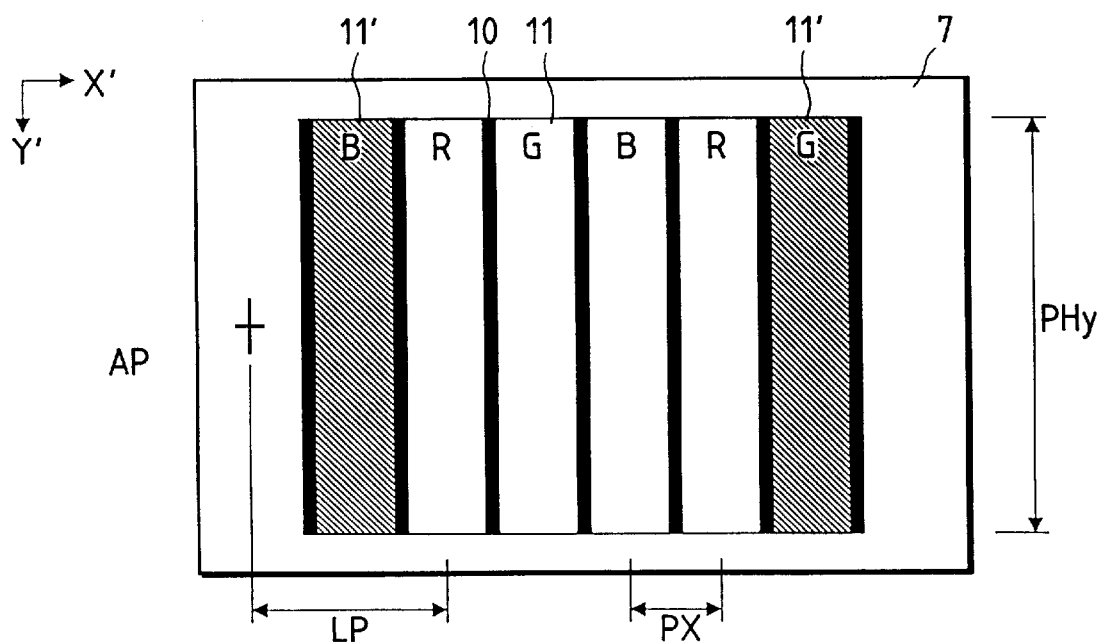

FIGS. 26A and 26B are schematic plan views showing set positions of electron-emitting devices and stripes of fluorescent substances in the display panel of Embodiment 3. FIG. 26A shows an array of electron-emitting devices 2 formed on a substrate 1, and FIG. 26B shows an array of stripe-shaped fluorescent substances 11, 11' formed on a face plate 7. An alignment mark AE, a distance LE, an alignment mark AP, a distance LP, a distance EBy, distance PHy, an array pitch PX and an array pitch PY are designed in accordance with the same principle as in FIGS. 1A and 1B. The face plate in FIG. 26B is different from the face plate in FIG. 1B in that the preliminary stripes of fluorescent substances 11' are additionally provided. Specifically, in addition to the stripes of fluorescent substances 11 provided corresponding to the array of electron-emitting devices on the substrate shown in FIG. 26A, the preliminary stripes of fluorescent substances 11' indicated as hatched areas are provided on both sides of 11. The reason is that the preliminary stripes of fluorescent substances 11' serve to prevent an image from lacking in its edge, which may occur as a result of correcting the position irradiated by the electron beam within one pitch when the stripe of fluorescent substance is deviated over one pitch in the X-direction with respect to the electron-emitting device in this Embodiment 3 as described above. While the preliminary stripes of fluorescent substances 11 are provided one on each of the right and left sides in FIG. 26B, the preliminary stripes of fluorescent substances may be provided in a larger number when a positional deviation possibly over two pitches is estimated. Further, colors of the preliminary stripes of fluorescent substances 11' in the illustrated case are determined in accordance with the rule of color sequence for the stripes of fluorescent substances 11 (i.e., repetition of R, G, B).

An electric circuitry for used in the image display device of Embodiment 3 will be described below with reference to FIG. 27.

Figure 27:
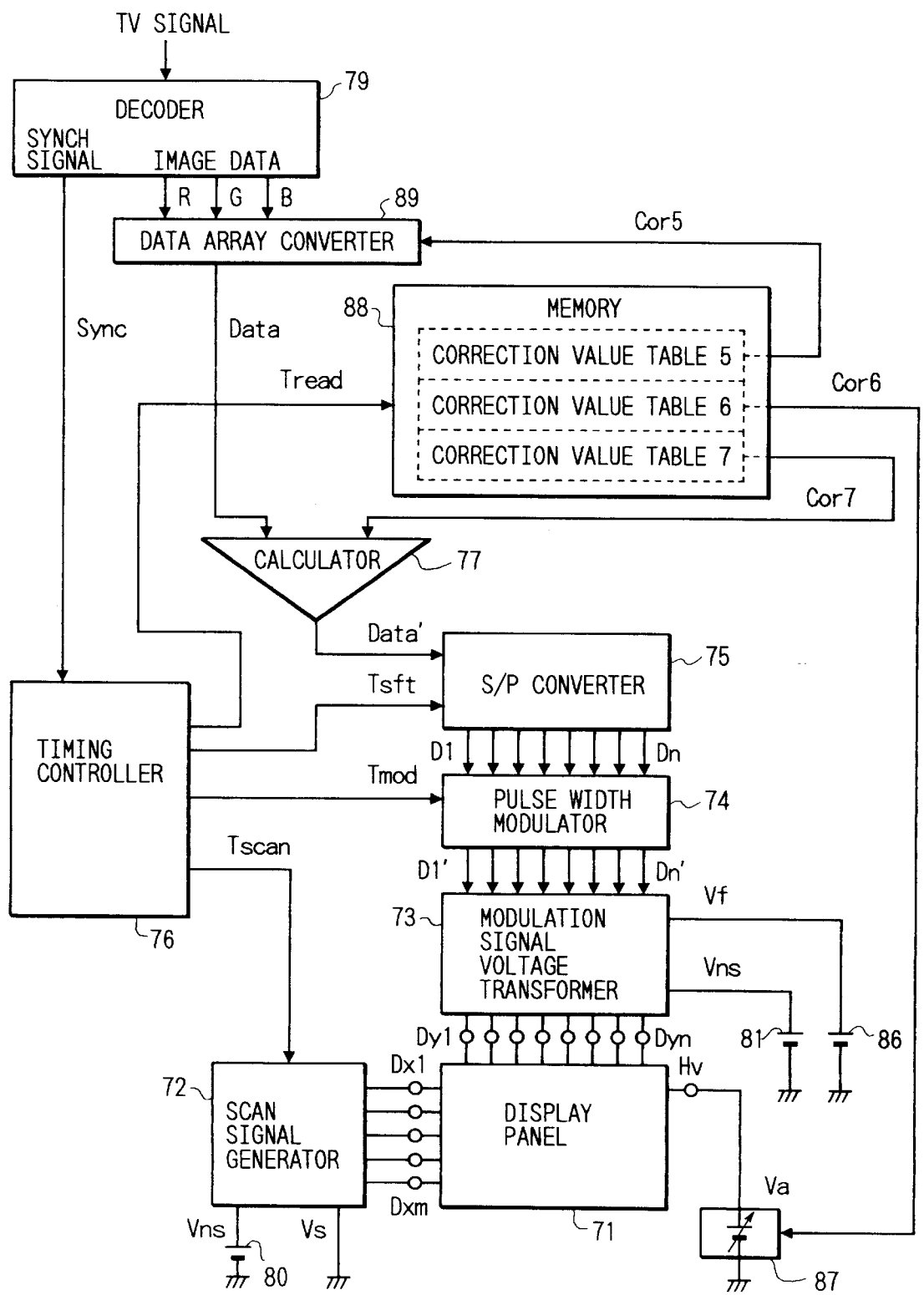
FIG. 27 is a block diagram of an electric circuitry of Embodiment 3.
Figure 28:
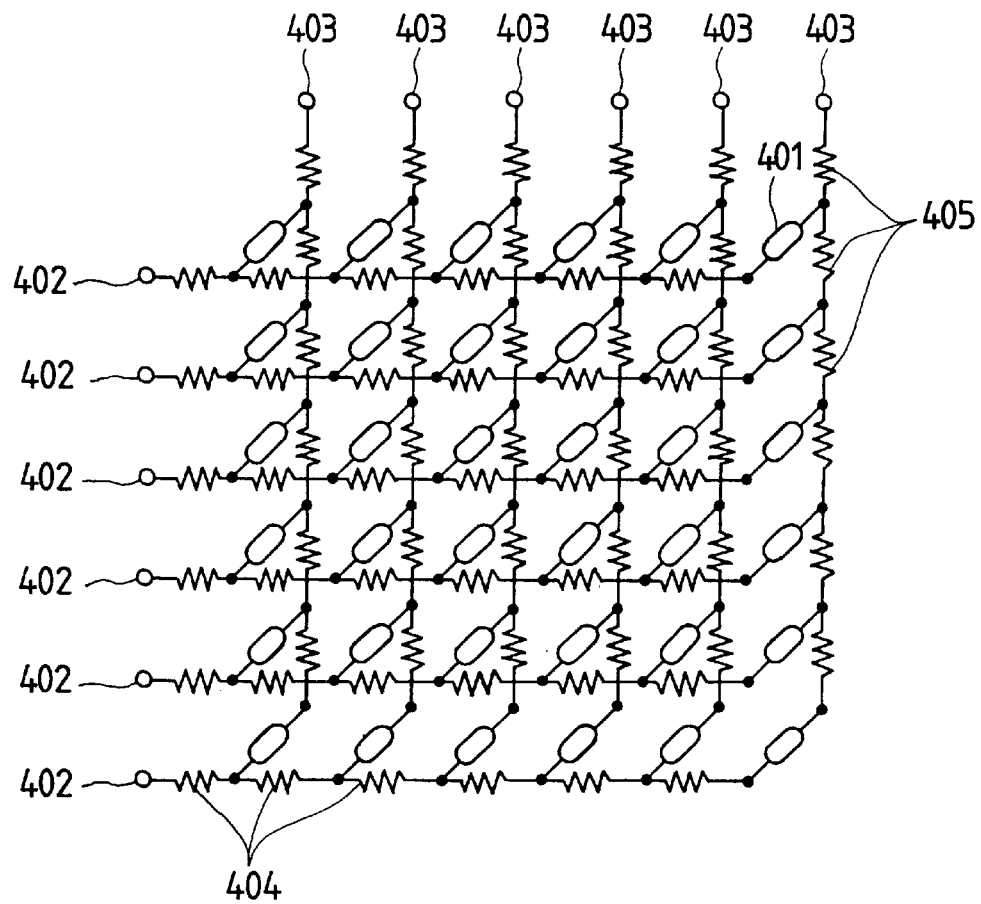
FIG. 28 is a diagram for explaining a wiring method for electron-emitting devices which has been tried by the inventors.
Figure 29:
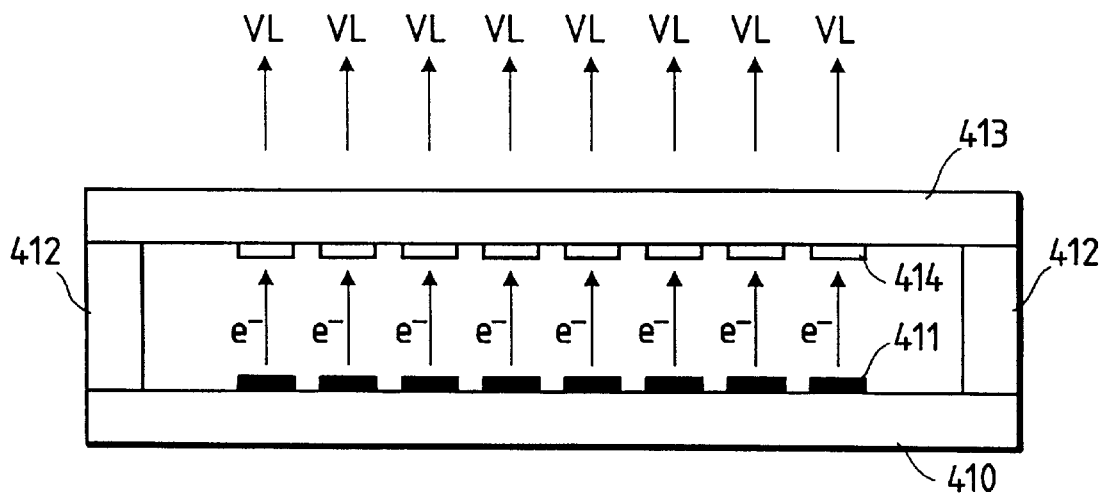
FIG. 29 is a sectional view for explaining the technical problem, to be solved by the present invention, in a display panel of an image display device.

FIG. 27 is a block diagram showing the basic configuration of the electric circuitry. In FIG. 27, denoted by 71 is a display panel, 72 is a scan signal generator, 73 is a modulation signal voltage transformer, 74 is a pulse width modulator, 75 is a serial/parallel (S/P) converter, 76 is a timing controller, 77 is a calculator, 79 is a decoder, 80 is a constant-voltage source, 81 is another constant-voltage source, 86 is still another constant-voltage source, and 87 is a controlled voltage source. These circuits have the same functions as those of the corresponding circuits in Embodiment 2 described above with reference to FIG. 24. Further, 88 is a memory storing three correction value tables 5 to 7 and 89 is a data array converter operated in accordance with a control signal Cor5.

In the electric circuitry of FIG. 27, the positions irradiated by the electron beams are corrected by correcting the drive voltage Va applied to the fluorescent substances. More specifically, a correction value of the voltage Va applied to the fluorescent substances is stored as data of the correction table 6 in the memory 88, and the controlled voltage source 87 connected to a terminal Hv of the display panel 71 outputs a voltage in accordance with a correction value Cor6 read out of the correction value table 5. Here, the correction value Cor6 represents a value suitable for correcting the positions irradiated by the electron beams within one pitch. Practically, the output voltage of the controlled voltage source 87 is set to 5 kV as a reference value and corrected in accordance with the correction value Cor6. Also, the output voltages of the constant-voltage sources 80, 81 are each set to Vns=7.2 V, while the output voltage of the constant-voltage source 86 is set to Vf=14.2 V.

The correction table 7 in the memory 88 stores a correction coefficient for correcting the image data Data as with the correction table 4 in FIG. 24.

Further, the correction table 5 in the memory 88 stores information for array correction necessary to correct the array obtained by the data array converter 89.

The data array converter 89 arranges the image data R, G, B following the color sequence initially set when the positional deviation between the electron-emitting device and the stripe of fluorescent substance in the X-direction is within one pitch, but changes the color sequence when the positional deviation is over one pitch.

With the above circuit configuration, the path of the electron beam can be corrected within one stripe pitch of the fluorescent substances by correcting the voltage Va applied to the fluorescent substances, and the drive signal applied to the electron-emitting device can be replaced by the drive signal for the fluorescent substance which is to be actually irradiated by the electron beam from that electron-emitting device.

While the path of the electron beam is corrected by correcting the voltage Va applied to the fluorescent substances in the electric circuitry of FIG. 27, it is also easily possible to realize a circuit configuration in which the path of the electron beam is corrected by correcting the voltage Vf applied to the electron-emitting device, taking into account the circuit configuration of FIG. 18.

The image display device of Embodiment 3 has been described above. As will be apparent from the description, a good display image can be provided regardless of whether the electron-emitting devices and the stripes of fluorescent substances are deviated or not from their proper positional relationship. With Embodiment 3, particularly, a good image can be provided even when the positional deviation between the electron-emitting device and the stripe of fluorescent substance is as large as one stripe pitch.

According to the present invention, as fully described hereinabove, even if the electron-emitting devices and the stripes of fluorescent substances are deviated from their set positions after assembly of the display panel, it is possible to not only prevent a displayed image from lacking its edge, but also avoid luminance from becoming insufficient or uneven in the image screen. Inexact coloration or mixing can also prevented.

In other words, deterioration of image quality caused by deviations from the set positions can-be prevented.

As a result, the present invention can provide advantages of preventing deterioration of image quality, reducing variations in characteristics depending upon individual display devices, and increasing a production yield.

What is claimed is:

1. An image-forming apparatus comprising:
   an electron beam source composed of a plurality of electron-emitting devices, each of said electron-emitting devices having a pair of electrodes to which a voltage is applied and an electron-emitting region disposed between said pair of electrodes, said pair of electrodes and said electron-emitting region being arranged side-by-side;
   image-forming members for forming an image upon irradiation by respective electron beams emitted from said electronic-emitting devices;
   drive means for applying respective drive signals to between said pair of electrodes of said electron-emitting devices in accordance with image signals;
   voltage applying means for applying a voltage to between said electron-emitting devices and said image-forming members; and
   voltage adjustment means adapted to adjust the voltage applied to between said electron-emitting devices and said image-forming members by said voltage applying means to correct the trajectories of the respective electron beams in accordance with a positional deviation of an as-assembled relative position between said electron-emitting devices and said image-forming members from a predetermined desired relative position between said electron-emitting devices and said image-forming members.

2. An image forming apparatus according to claim 1, wherein said electron emitting devices are arranged in rows parallel to the common direction, and wherein said voltage adjustment means is adapted to adjust the voltage applied by said voltage applying means so that a different respective adjusted voltage shall be applied when respective rows of said electron-emitting devices are caused to irradiate, thereby to compensate for a deviation in the set angle of the image-forming members relative to the common direction.

3. An image-forming apparatus according to claim 2, wherein said image-forming members comprise parallel stripe-shaped members each extending in a direction substantially orthogonal to the common direction.

4. An image-forming apparatus according to claim 1, wherein said image-forming members comprise parallel stripe-shaped members each extending in a direction substantially orthogonal to the common direction.

5. An image-forming apparatus according to claim 1, wherein said apparatus includes image signal correction means for correcting image signals supplied to said drive means in accordance with a positional deviation of a relative position between said electron-emitting devices and said image-forming members from a predetermined relative position between said electron-emitting devices and said image-forming members, to compensate for the effect of correcting the beam trajectories.

6. An image-forming apparatus according to claim 1, wherein said apparatus includes means for adjusting pulse widths of the drive signals in accordance with, to compensate for the effect of correcting the beam trajectories.

7. An image-forming apparatus according to claim 1, further comprising means for shifting an array sequence order of the image signals in accordance with a positional deviation of a relative position between said electron-emitting devices and said image-forming members from a predetermined relative position between said electron-emitting devices and said image-forming members.

8. An image-forming apparatus according to claim 1, wherein the region of said image-forming members is larger than the region in which said electron beam source is arranged on a substrate so that irradiation of the image-forming members, by said electron-emitting devices at edges of the region of said electron source, is assured.

9. An image-forming apparatus according to claim 1, wherein the region of said image-forming members is larger by extension in the common direction than the region in which said electron beam source is arranged on the substrate.

10. An image-forming apparatus according to claim 1, further comprising a drive circuit including said drive means, said voltage applying means, and said voltage adjustment means.

11. An image-forming apparatus comprising:
    an electron beam source composed of a plurality of electron-emitting devices, each of said electron-emitting devices having a pair of electrodes to which a voltage is applied and an electron-emitting region disposed between said pair of electrodes, said pair of electrodes and said electron-emitting region being arranged side-by-side;
    image-forming members for forming an image upon irradiation by respective electron beams emitted from said electron-emitting devices;
    drive means for applying respective drive signals to between said pair of electrodes of said plurality of electron-emitting devices in accordance with image signals;
    voltage applying means for applying a voltage to between said electron-emitting devices and said image-forming members; and
    drive signal adjustment means adapted to adjust the voltage applied to between said pair of electrodes by said drive means to correct the trajectories of the respective electron beams in accordance with a positional deviation of an as-assembled relative position between said electron-emitting devices and said image-forming members from a predetermined desired relative position between said electron-emitting devices and said image-forming members.

12. An image forming apparatus according to claim 11, wherein said electron emitting devices are arranged in rows parallel to said common direction, and wherein said drive signal adjustment means is adapted to adjust the voltage of drive signals so that a different respective adjusted voltage shall be applied when respective rows of said electron-emitting devices are caused to irradiate, thereby to compensate for a deviation in the set angle of the image-forming members relative to the common direction.

13. An image-forming apparatus according to claim 12, wherein said image-forming members comprise parallel stripe-shaped members each extending in a direction substantially orthogonal to the common direction.

14. An image-forming apparatus according to claim 11, wherein said image-forming members comprise parallel stripe-shaped members each extending in a direction substantially orthogonal to the common direction.

15. An image-forming apparatus according to claim 11, further comprising a drive circuit including said drive means, said voltage applying means, and said voltage adjustment means.

16. Apparatus according to claim 1 or 11, wherein said apparatus further includes image signal correction means for correcting the image signals supplied to said drive means in accordance with a positional deviation from the predetermined value corresponding to the relative position between said electron-emitting devices and said image forming members.

17. Apparatus according to claim 16, wherein said image signal correction means includes means for correcting luminance data of the image signals in accordance with a positional deviation from the predetermined value corresponding to the relative position between said electron-emitting devices and said image-forming members.

18. Apparatus according to claim 16, wherein said image signal correction means includes means for correcting an array of the image signals in accordance with a positional deviation from the predetermined value corresponding to the relative position between said electron-emitting devices and said image-forming members.

19. Apparatus according to claim 1 or 11, wherein said apparatus further includes means for correcting pulse widths of the drive signals in accordance with a positional deviation from the predetermined value corresponding to the relative position between said electron-emitting devices and said image-forming members.

20. Apparatus according to claim 1 or 11, wherein said electron-emitting devices are carried on a first substrate while said image-forming members are carried on a second substrate and the positional deviation is detected based on a positional deviation between a first alignment mark printed on the first substrate and a second alignment mark printed on the second substrate.

21. Apparatus according to claim 1 or 11, wherein the region of said image-forming members is larger than the region in which said electron beam source is arranged on said substrate.

22. Apparatus according to claim 21, wherein said image-forming members comprise stripe-shaped members, and wherein a region of said image-forming members is larger in the direction in which said stripe-shaped members extend, th an the region in which said electron beam source is arranged on said substrate.

23. Apparatus according to claim 21, wherein said image-forming members comprise stripe-shaped members, and wherein a region of said image-forming members is larger in a direction perpendicular to the direction in which said stripe-shaped members are extending, than the region in which said electron beam source is arranged on said substrate.

24. An image-forming apparatus according to claim 1 or 11, wherein said electron-emitting devices are lateral field-effect electron-emitting devices.

25. An image-forming apparatus according to claim 1 or 11, wherein said electron-emitting devices are surface conduction electron-emitting devices.

26. An image-forming apparatus according to claim 1 or 11, wherein said image-forming members are stripes of fluorescent substances.

27. A method for correcting electron beam-irradiation positions in an image-forming apparatus comprising: an electron beam source composed of a plurality of electron-emitting devices, each of said electron-emitting devices having a pair of electrodes to which a voltage is applied and an electron-emitting region disposed between said pair of electrodes, said pair of electrodes and said electron-emitting region being arranged side-by-side; image-forming members for forming an image upon irradiation by respective electron beams emitted from said electron-emitting devices; drive means for applying respective drive signals to between said pair of electrodes of said electron-emitting devices in accordance with image signals; and voltage applying means for applying a voltage to between said electron-emitting devices and said image-forming members, said method comprising the step of:

adjusting the voltage applied to between said electron-emitting devices and said image-forming members by said voltage applying means to correct the trajectories of the respective electron beams in accordance with a positional deviation of a relative an as-assembled position between said electron-emitting devices and said image-forming members from a predetermined desired relative position between said electron-emitting devices and said image-forming members.

28. A method for correcting electron beam-irradiated positions in an image-forming apparatus comprising: an electron beam source composed of a plurality of electron-emitting devices, each of said electron-emitting devices having a pair of electrodes to which a voltage is applied and an electron-emitting region disposed between said pair of electrodes, said pair of electrodes and said electron-emitting region being arranged side-by-side; image-forming members for forming an image upon irradiation by respective electron beams emitted from said electron-emitting devices; drive means for applying respective drive signals to between said pair of electrodes of said electron-emitting devices in accordance with image signals; and voltage applying means for applying a voltage to between said electron-emitting devices and said image-forming members; said method comprising the step of:

adjusting the voltage applied to between said pair of electrodes by said drive means to correct the trajectories of the respective electron beams in accordance with a positional deviation of an as-assembled relative position between said electron-emitting devices and said image-forming members from a predetermined desired relative position between said electron-emitting devices and said image-forming members.

29. A method according to claim 28, wherein said correcting step comprises correcting the drive signals by correcting image signals supplied to drive means for applying drive signals to said electron-emitting devices.

30. A method according the claim 29, further comprising correcting luminance data of the image signals supplied to drive means for applying drive signals to said electron-emitting devices.

31. A method according to claim 29, further comprising correcting an array of the image signals in accordance with a positional deviation from the predetermined value corresponding to the relative position between said electron-emitting devices and said image-forming members.

32. A method according to claim 28, wherein correcting step comprises correcting the drive signals by correcting pulse widths of the drive signals in accordance with a positional deviation from the predetermined value corresponding to the relative position between said electron-emitting devices and said image-forming members.

33. A method according to claim 27 or 28, wherein said image-forming members are stripe-shaped members, and each of said plurality of electron-emitting devices comprises a negative electrode, an electron emitting region and a positive electrode which are arranged on a surface of said substrate side by side in a direction perpendicular to the direction in which said stripe-shaped members extend.

34. A method according to claim 33, wherein the region of said image-forming members is larger in the direction in which said stripe-shaped members extend, than the region in which said electron beam source is arranged on said substrate.

35. A method according to claim 33, wherein the region of said image-forming members is larger in a direction perpendicular to the direction in which said stripe-shaped members extend, than the region in which said electron beam source is arranged on said substrate.

36. A method according to claim 27 or 28, wherein said electron-emitting devices are carried on a first substrate while said image-forming members are carried on a second substrate and the positional deviation is detected based on a positional deviation between a first alignment mark printed on the first substrate and a second alignment mark printed on the second substrate.

37. A method according to claim 27 or 28, wherein the region of said image-forming members is larger than the region in which said electron beam source is arranged on said substrate.

38. A method according to claim 27 or 28, wherein said electron-emitting devices are lateral field-effect electron-emitting devices.

39. A method according to claim 27 or 28, wherein said electron-emitting devices are surface conduction electron-emitting devices.

40. A method according to claim 27 or 28, wherein said image-forming members are stripes of fluorescent substances.

41. An image-forming apparatus comprising:
   an electron beam source composed of a plurality of electron-emitting devices, each of said electron-emitting devices having a pair of electrodes to which a voltage is applied and an electron-emitting region disposed between said pair of electrodes, said pair of electrodes and said electron-emitting region being arranged side-by-side;
   image-forming members for forming an image upon irradiation by respective electron beams emitted from said electron-emitting devices;
   drive means for applying respective drive signals to between said pair of electrodes of said electron-emitting devices in accordance with image signals;
   voltage means for applying a voltage to between said electron-emitting devices and said image-forming members; and
   shifting means to shift an array sequence order of the image signals in accordance with a positional deviation of an as-assembled relative position between said electron-emitting devices and said image-forming members from a predetermined desired relative position between said electron-emitting devices and said image-forming members.

42. Apparatus according to claim 41, wherein said image-forming members comprise stripe-shaped members, and wherein a region of said image-forming members is larger in the direction in which said stripe-shaped members extend, than the region in which said electron beams source is arranged on said substrate.

43. Apparatus according to claim 41 or 42, wherein said electron-emitting devices are carried on a first substrate while said image-forming members are carried on a second substrate and the positional deviation is detected based on a positional deviation between a first alignment mark printed on the first substrate and a second alignment mark printed on the a second substrate.

44. Apparatus according to claim 41 or 42, wherein said electron-emitting devices are lateral field-effect electron-emitting devices.

45. Apparatus according to claim 41 or 42, wherein said electron-emitting devices are surface conduction electron-emitting devices.

46. An image-forming apparatus according to claim 41, wherein said image-forming members comprise parallel stripe-shaped members each extending in a direction substantially orthogonal to the common direction, and wherein said electron-emitting devices are arranged in a straight line in a direction parallel to the common direction.

47. An image-forming apparatus according to claim 41, wherein said image-forming members comprise stripes of R fluorescent substance, G fluorescent substance, and B fluorescent substance arranged periodically in order in the common direction.

48. An image-forming apparatus according to claim 41, wherein said image-forming members comprise stripe-shaped members, and wherein the number of stripe-shaped members arranged in the common direction is larger than the number of said electron-emitting devices arranged in a straight line.

49. A method of correcting an image-forming operation in an image-forming apparatus comprising: an electron beam source composed of a plurality of electron-emitting devices, each of said electron-emitting devices having a pair of electrodes to which a voltage is applied and an electron-emitting region disposed between said pair of electrodes, said pair of electrodes and said electron-emitting region being arranged side-by-side; image-forming members for forming an image upon irradiation by respective electron beams emitted from said electron-emitting devices; drive means for applying respective drive signals to between said pair of electrodes of said electron-emitting devices in accordance with image signals, and voltage applying means for applying a voltage to between said electron-emitting devices and said image-forming members, said method comprising the step of:
   shifting an array sequence order of the image signals supplied to said drive means for applying drive signals to said electron-emitting devices in accordance with a positional deviation of an as-assembled relative position between said electron-emitting devices and said image-forming members from a predetermined desired relative position between said electron-emitting devices and said image forming members.

50. A method according to claim 49, wherein said image-forming members comprise parallel stripe-shaped members each extending in a direction substantially orthogonal to a common direction, and wherein said electron-emitting devices are arranged in a straight line in a direction parallel to the common direction.

51. A method according to claim 49 or 50, wherein said image-forming members comprise stripe-shaped members, and wherein a region of said image-forming members is larger in the direction in which said stripe-shaped members extend than the region in which said electron beam source is arranged on said substrate.

52. A method according to claim 49 or 50, wherein said electron-emitting devices are carried on a first substrate while said image-forming members are carried on a second substrate and the positional deviation is detected based on a positional deviation between a first alignment mark printed on the first substrate and a second alignment mark printed on the second substrate.

53. A method according to claim 49 or 50, wherein said electron-emitting devices are lateral field-effect electron-emitting devices.

54. A method according to claim 49 or 50, wherein said electron-emitting devices are surface conduction electron-emitting devices.

55. A method according to claim 49, wherein said image-forming members comprise stripes of R fluorescent substance, G fluorescent substance, and B fluorescent substance arranged periodically in order in the common direction.

56. A method according to claim 49, wherein said image-forming members comprise stripe-shaped members, and wherein the number of stripe-shaped members arranged in the common direction is larger than the number of said electron-emitting devices arranged in a straight line.

57. A method of correcting electron beam-irradiated positions in an image-forming apparatus having an electron beam source including a plurality of electron-emitting devices arranged on a substrate in a matrix form, and image-forming members for forming an image upon irradiation of electron beams emitted from said electron-emitting devices, each of said plurality of electron-emitting devices having a pair of electrodes to which a voltage is applied and an electron-emitting region disposed between said pair of electrodes, said pair of electrodes and said electron-emitting region being arranged side-by-side, comprising the step of:

correcting the electron beam-irradiated positions by adjusting the voltage applied to between said electron-emitting devices and said image-forming members, in accordance with a positional deviation of an as-assembled relative position between said electron-emitting devices and said image-forming members from a predetermined desired relative position between said electron-emitting devices and said image-forming members.

58. A method of correcting electron beam-irradiated positions in an image-forming apparatus having an electron beam source comprising a plurality of electron-emitting devices arranged on a substrate in a matrix form, and image-forming members for forming an image upon irradiation of electron beams emitted from said electron-emitting devices, each of said plurality of electron-emitting devices having a pair of electrodes to which a voltage is applied and an electron-emitting region disposed between said pair of electrodes, said pair of electrodes and said electron-emitting region being arranged side-by-side, comprising the step of:

correcting said electron beam-irradiated positions by adjusting the voltages applied to between said pair of electrodes in accordance with a positional deviation of an as-assembled relative position between said electron-emitting devices and said image-forming members from a predetermined desired relative position between said electron-emitting devices and said image-forming members.

59. A method according to claim 58, wherein the image-forming members comprise parallel strip-shaped members each extending in a direction substantially orthogonal to the common direction.

60. A method according to claim 58, further including the step of correcting image signals supplied to a drive means to compensate for the effect of correcting the beam trajectories.

61. A method according to claim 60, further comprising the step of correcting luminance data of the image signals supplied to the drive means for applying drive signals to said electron-emitting devices.

62. A method according to claim 58, further comprising the step of shifting an array sequence order of the image signals in accordance with a positional deviation of a relative position between said electron-emitting devices and said image-forming members from a predetermined relative position between said electron-emitting devices and said image-forming members.

63. A method according to claim 58, further including the steps of:

detecting and measuring the positional deviations with reference to first and second alignment marks on said substrate and on a second substrate carrying said image-forming members, respectively; and using the results of the measurement to determine applied voltage.

64. A method according to claim 63, further including the step of entering correction value data in accordance with the results of said measurement into a memory and using said correction value data, stored in said memory, to determine the adjustment of said applied voltages.

65. A method according to claim 64, wherein the region of said image-forming members is larger by extension in the common direction than the region in which said electron beam source is arranged on said substrate.

66. A method according to claim 58, wherein the region of the image-forming members is larger than the region in which the electron beam source is arranged on a substrate, and further comprising the step of irradiating image-forming members at an edge of the region of image-forming members by electron-emitting devices at an edge of the region of the electron beam source.

67. A method according to claim 66, wherein the region of said image-forming members is larger by extension in the common direction than the region in which said electron beam source is arranged on said substrate.

68. A method according to claim 58, further comprising the step of applying different respective adjusted voltages when respective matrix rows of said electron-emitting devices parallel to the common direction are caused to irradiate, thereby to compensate for a deviation in the set angle of the image-forming members relative to the common direction.

69. An image-forming apparatus comprising:

an electron beam source comprising an electron-emitting device, said electron-emitting device having a pair of electrodes to which a voltage is applied and an electron-emitting region disposed between said pair of electrodes, said pair of electrodes and said electron-emitting region being arranged side-by-side;

an image-forming member for forming an image upon irradiation by an electron beam emitted from said electron-emitting device;

drive means for applying drive signals to between said pair of electrodes of said electron-emitting device in accordance with image signals;

voltage applying means for applying a voltage to between said electron-emitting devices and said image-forming member; and voltage adjustment means adapted to adjust the voltage applied to between said electron-emitting device and said image-forming member by said voltage applying means to correct the trajectory of the electron beam in accordance with a positional deviation of an as-assembled relative position between said electron-emitting device and said image-forming member from a predetermined desired relative position between said electron-emitting device and said image-forming member.

70. An image-forming apparatus comprising:

an electron beam source comprising an electron-emitting device, said electron-emitting device having a pair of electrodes to which a voltage is applied and an electron-emitting region disposed between said pair of electrodes, said pair of electrodes and said electron-emitting region being arranged side-by-side;

an image forming member for forming an image upon irradiation of an electron beam emitted from said electron-emitting device;

drive means for applying drive signals to between said pair of electrodes of the electron-emitting device in accordance with image signals;

voltage applying means for applying voltage to between said electron-emitting device and said image-forming member; and drive signal adjustment means adapted to adjust the voltage applied to between said pair of electrodes by said drive means to correct the trajectory of the electron beam in accordance with a positional deviation of an as-assembled relative position between said electron-emitting device and said image-forming member from a predetermined desired relative position between said electron-emitting device and said image-forming member.

71. An image-forming apparatus comprising:

an electron beam source comprising a plurality of electron-emitting devices disposed on a substrate;

image-forming members for forming an image upon irradiation of electron beams emitted from said electron-emitting devices;

drive means for applying drive signals to said plurality of electron-emitting devices in accordance with image signals; and shifting means for shifting an array sequence order of the image signals in accordance with a positional deviation of an as-assembled relative position between said electron-emitting devices and said image forming members from a predetermined desired relative position between said electron-emitting devices and said image forming members.

72. A method of correcting an image-forming operation in an image-forming apparatus having (i) an electron beam source comprising a plurality of electron-emitting devices disposed on a substrate, (ii) image-forming members for forming an image upon irradiation of electron beams emitted from said electron-emitting devices, and (iii) drive means for applying drive signals to said plurality of electron-emitting devices in accordance with image signals, said method comprising the step of:

shifting an array sequence order of the image signals supplied to said drive means for applying drive signals to said electron-emitting devices in accordance with a positional deviation of an as-assembled relative position between said electron-emitting devices and said image-forming members from a predetermined desired relative position between said electron-emitting devices and said image forming members.

73. A method of correcting electron beam-irradiated positions in an image forming apparatus having (i) an electron beam source including an electron-emitting device disposed on a substrate and (ii) an image-forming member for forming an image upon irradiation of an electron beam emitted from said electron-emitting device, said electron-emitting device having a pair of electrodes to which a voltage is applied and an electron-emitting region disposed between said pair of electrodes, said pair of electrodes and said electron-emitting region being arranged side-by-side, said method comprising the step of:

correcting the electron beam-irradiated position by adjusting the voltage applied to between said electron-emitting device and said image-forming member, in accordance with a positional deviation of an as-assembled relative position between said electron-emitting device and said image-forming member from a predetermined desired relative position between said electron-emitting and said image-forming member.

74. A method of correcting electron beam-irradiated positions in an image forming apparatus having (i) an electron beam source including an electron-emitting device disposed on a substrate, and (ii) an image-forming member for forming an image upon irradiation of an electron beam emitted from said electron-emitting device, said electron-emitting device having a pair of electrodes to which a voltage is applied and an electron-emitting region disposed between said pair of electrodes, said pair of electrodes and said electron-emitting region being arranged side-by-side, said method comprising the step of:

correcting the electron beam-irradiated position by adjusting the voltage applied to between said pair of electrodes in accordance with a positional deviation of an as-assembled relative position between said electron-emitting device and said image-forming member from a predetermined desired relative position between said electron-emitting device and said image-forming member.

75. An image-forming apparatus according to any one of claims 1, 11, 41, and 71, wherein, in said electron beam source, said plurality of electron-emitting devices are arranged so that the directions of the dispositions of respective pairs of electrodes coincide with one another.

76. An image-forming apparatus according to any one of claims 69 and 70, wherein said electron beam source comprises a plurality of electron-emitting devices, said plurality of electron-emitting devices being arranged so that the directions of the dispositions of respective pairs of electrodes coincide with one another.

77. A method according to any one of claims 25, 28, 49, 57, 58, and 72, wherein, in said electron beam source, said plurality of electron-emitting devices are arranged so that the directions of the dispositions of respective pairs of electrodes coincide with one another.

78. A method according to any one of claims 73 and 74, wherein said electron beam source comprises a plurality of electron-emitting devices, said plurality of electron-emitting devices being arranged so that the directions of the dispositions of respective pairs of electrodes coincide with one another.

* * * * *

UNITED STATES PATENT AND TRADEMARK OFFICE
CERTIFICATE OF CORRECTION

PATENT NO. : 6,121,942
DATED : September 19, 2000
INVENTOR(S) : Yoshihisa Sanou et al.

It is certified that error appears in the above-identified patent and that said Letters Patent is hereby corrected as shown below:

Title page,
Item [56] REFERENCES CITED, OTHER PUBLICATIONS,

Page 2, after "Electrical Conduction and Electron Emission of Discontinuous Thin Films"," "Solids" should read -- Solid --.

Sheet 23,
Fig. 30, "PRIOR ART" should be deleted and re-inserted as printed text;

Fig. 31, "PRIOR ART" should be deleted and re-inserted as printed text;

Fig. 32, "PRIOR ART" should be deleted and re-inserted as printed text.

Column 11,
Line 60, "oaf" should read -- of --.

Column 12,
Line 12, "Vf V" should read -- Vf (V) --;
Line 14, "Va V" should read -- Va (V) --;
Line 51, "Vf V" should read -- Vf (V) --;
Line 53, "¶ Therefore," should read -- Therefore, --.

Column 15,
Line 56, "hundreds" (both occurrences) should read -- hundred --;
Line 58, "tens" should read -- tens of --;
Line 60, "hundreds" should read -- hundred --.

Column 16,
Line 4, "thousands" should read -- thousand --;
Line 14, "thousands" should read -- thousand --;
Line 43, "hundreds" should read -- hundred --.

Column 19,
Line 8, "1e" should read -- Ie --;
Line 12, "1e" should read -- Ie --;
Line 14, "1e" should read -- Ie --;
Line 16, "1e" should read -- Ie --.

UNITED STATES PATENT AND TRADEMARK OFFICE
CERTIFICATE OF CORRECTION

PATENT NO. : 6,121,942
DATED : September 19, 2000
INVENTOR(S) : Yoshihisa Sanou et al.

It is certified that error appears in the above-identified patent and that said Letters Patent is hereby corrected as shown below:

Column 20,
Line 8, "¶ Forming" should read -- Forming --;
Line 9, "sing" should read -- using --.

Column 22,
Line 6, "form" should read -- from --;
Line 16, "Va V" should read -- Va (V) --;
Line 20, "musbe" should read -- must be --;
Line 22, "d esired" should read -- desired --;
Line 49, "G." should read -- G, --.

Column 24,
Line 28, "tions" should read -- tion --;
Line 45, "can be" should read -- can --;
Line 46, "remained" should read -- remain --.

Column 25,
Line 32, "dif2 m" should read -- dif2 (m) --;
Line 35, "Lh m" should read -- Lh (m) --;
Line 37, "VfV" should read -- Vf (V) --;
Line 39, "Vf'V" should read -- Vf ' (V) --;
Line 41, "Va V" should read -- Va (V) --.

Column 26,
Line 2, "Tabels" should read -- tables --;
Line 9, "corrections" should read -- correction --.

Column 27,
Line 26, "Ebodiment 2" should read -- Embodiment 2 --.

Column 28,
Line 55, "dif2 m" should read -- dif2 (m) --;
Line 58, "Lh m" should read -- Lh (m) --;
Line 60, "Vf V" should read -- Vf (V) --;
Line 61, "Va V" should read -- Va (V) --;
Line 63, "Va ' V" should read -- Va ' (V) --.

UNITED STATES PATENT AND TRADEMARK OFFICE
CERTIFICATE OF CORRECTION

PATENT NO. : 6,121,942
DATED : September 19, 2000
INVENTOR(S) : Yoshihisa Sanou et al.

It is certified that error appears in the above-identified patent and that said Letters Patent is hereby corrected as shown below:

Column 29,
Line 25, "values" should read -- value tables --.

Column 31,
Line 51, "used" should read -- use --;

Column 32,
Line 61, "also" should read -- also be --.

Column 33,
Line 11, "electronic-emitting" should read -- electron-emitting --;
Line 30, "electron emitting" should read -- electron-emitting --.

Column 34,
Line 41, "electron emitting" should read -- electron-emitting --.

Column 35,
Line 33, "th" should be deleted;
Line 34, "an" should read -- than --.

Column 36,
Line 5, "a relative an as-assembled" should read -- an as-assembled relative --;
Line 34, delete "cor-";
Line 35, "recting" should read -- adjusting --;
Line 47, "correcting" should read -- said adjusting --;
Line 56, "electron emitting" should read -- electron-emitting --.

Column 37,
Line 51, "beams" should read -- beam --;
Line 59, "a" should be deleted.

Column 39,
Line 47, "strip-shaped" should read -- stripe-shaped --.

UNITED STATES PATENT AND TRADEMARK OFFICE
CERTIFICATE OF CORRECTION

PATENT NO. : 6,121,942
DATED : September 19, 2000
INVENTOR(S) : Yoshihisa Sanou et al.

It is certified that error appears in the above-identified patent and that said Letters Patent is hereby corrected as shown below:

Column 42,
Line 44, "25," should read -- 27, --.

Signed and Sealed this

Sixth Day of November, 2001

Attest:

*Attesting Officer*

NICHOLAS P. GODICI
*Acting Director of the United States Patent and Trademark Office*